US009975566B2

(12) United States Patent
Herbault

(10) Patent No.: US 9,975,566 B2
(45) Date of Patent: May 22, 2018

(54) FOLDING BEARING STRUCTURE, STROLLER

(76) Inventor: Patrick Herbault, La Garenne Colombes (FR)

(*) Notice: Subject to any disclaimer, the term of this patent is extended or adjusted under 35 U.S.C. 154(b) by 358 days.

(21) Appl. No.: 14/363,411

(22) PCT Filed: Sep. 12, 2012

(86) PCT No.: PCT/FR2012/052041
§ 371 (c)(1),
(2), (4) Date: Jul. 3, 2014

(87) PCT Pub. No.: WO2013/083890
PCT Pub. Date: Jun. 13, 2013

(65) Prior Publication Data
US 2014/0306428 A1    Oct. 16, 2014

(30) Foreign Application Priority Data

Dec. 8, 2011  (FR) ...................................... 11 61318

(51) Int. Cl.
*B62B 7/08*     (2006.01)
*B62B 3/02*     (2006.01)
*B62B 7/06*     (2006.01)

(52) U.S. Cl.
CPC .............. *B62B 3/022* (2013.01); *B62B 7/068* (2013.01); *B62B 7/08* (2013.01); *B62B 2205/02* (2013.01);
(Continued)

(58) Field of Classification Search
CPC .. B62B 3/02; B62B 3/022; B62B 7/06; B62B 7/08; B62B 7/083; B62B 7/086;
(Continued)

(56) References Cited

U.S. PATENT DOCUMENTS 991,150 A  *  5/1911  Griffith ................... B62B 7/086
                                                        297/19
1,094,455 A  *  4/1914  McGill ..................... B62B 7/10
                                                        280/39
(Continued)

FOREIGN PATENT DOCUMENTS

DE   295 06 777        7/1995
GB   191322567 A  *  9/1914  ............... B62B 7/10
GB   2 133 748          8/1984

OTHER PUBLICATIONS

International Search Report issued for International Application No. PCT/FR2012/052041, dated Jul. 12, 2012.

*Primary Examiner* — Emma K Frick
(74) *Attorney, Agent, or Firm* — Pillsbury Winthrop Shaw Pittman LLP

(57) ABSTRACT

A bearing structure includes a wheel assembly defining a first front wheel assembly and a second rear wheel assembly, the rear wheel assembly including at least two wheels spaced by a first width defining a first position; wheel supports connecting the axes of rotation of the wheels with the bearing structure; a first folding device enabling a first folding causing a reduction in spacing between the two rear wheels to a second width lower than the first width, defining a second position. A connection system, connecting the wheel supports of the first and second assemblies to the first folding device, enables a second folding of the wheels so as to allow a rotation substantially equal to 90° of the wheels in the horizontal plane when the wheels are in the second position.

6 Claims, 33 Drawing Sheets

(52) U.S. Cl.
CPC ....... *B62B 2205/06* (2013.01); *B62B 2205/12* (2013.01); *B62B 2205/14* (2013.01); *B62B 2205/18* (2013.01)

(58) Field of Classification Search
CPC ..... B62B 7/10; B62B 7/105; B62B 2206/003; B62B 2301/14; B62B 2205/01; B62B 2205/12; B62B 2205/123
See application file for complete search history.

(56) References Cited

U.S. PATENT DOCUMENTS

| | | | | |
|---|---|---|---|---|
| 1,094,458 A * | 4/1914 | McGill | ................... | B62B 7/10 280/39 |
| 1,122,516 A * | 12/1914 | Lloyd | ................... | B62B 7/10 280/39 |
| 2,170,227 A * | 8/1939 | Weber | ................... | B62B 7/10 280/37 |
| 2,436,643 A * | 2/1948 | Hafner | ................... | B62B 7/10 267/5 |
| 2,463,247 A * | 3/1949 | Cooklin | ................... | B62B 7/10 280/37 |
| 2,468,495 A * | 4/1949 | Holmstrom | ................... | B62B 7/10 280/39 |
| 2,534,539 A * | 12/1950 | Topper | ................... | B62B 7/10 188/20 |
| 2,549,958 A * | 4/1951 | Bosk | ................... | B62B 7/10 280/37 |
| 4,369,987 A * | 1/1983 | Witherell | ................... | B62B 7/10 248/166 |
| 7,641,217 B2 * | 1/2010 | Yoo | ................... | A61G 5/08 180/208 |
| 8,152,179 B2 * | 4/2012 | Yang | ................... | A61G 5/08 280/38 |
| 8,186,706 B2 * | 5/2012 | Dotsey | ................... | B62B 7/10 280/47.38 |
| 2010/0117336 A1 * | 5/2010 | Yang | ................... | A61G 5/08 280/639 |
| 2010/0219143 A1 * | 9/2010 | McCleave | ................... | B62B 3/02 211/85.8 |

\* cited by examiner

FOLDING BEARING STRUCTURE, STROLLER

CROSS REFERENCE TO RELATED APPLICATIONS

This application is the U.S. National Stage of PCT/FR2012/052041, filed Sep. 12, 2012, which in turn claims priority to French Patent Application No. 1161318 filed Dec. 8, 2011, the entire contents of all applications are incorporated herein by reference in their entireties.

FIELD

The invention relates to the field of folding bearing structures. In particular, the invention relates to the field of folding strollers. More specifically, the invention relates to folding devices for strollers in order to reduce its size when folded.

STATE OF THE ART

Currently, there are different technical solutions to fold and unfold strollers. Among these solutions, there is a whole family of strollers which fold by associating a folding movement of the guiding structure with a reduction in width of the latter. Within this family, there are particular models of the Mac Laren™ type, an example of which is shown in FIG. 1. These models reduce in size in space when folded. They are known as "umbrella strollers".

FIG. 1 A is an unfolded stroller 1 comprising a guiding frame, itself comprising guiding handles 101, the rear arms 102, front arms 103 and connecting means 104. Furthermore, the stroller comprises a set of front wheels 201, rear wheels 202 and a first folding device 300 positioned in the same horizontal plane of the wheels.

FIG. 1B shows a folded stroller 1. Connection means 104 allow a folding of the frame by bringing it in the same plane as that of wheels 201, 202. The height reduction of the stroller is performed by lowering the guiding structure in a substantially horizontal plane.

FIG. 2A shows a top view of stroller 1, in an unfolded configuration. The first folding device 300 forms a foldable cross, mainly around a central axis of rotation. The frame in top view intersects the plane of rods 102, 103.

FIG. 2B shows a top view of stroller 1, in a folded configuration. The cross of the first folding device 300 has completed a rotational movement leading to each side of the guiding frame to fold towards each other so as to reduce the width of the stroller.

The width reduction is obtained during the folding by the partial closure of a cross-shaped system placed horizontally One drawback of the existing solutions is the still important size of the folded stroller, in particular its height. In addition, current strollers' wheels tend to become larger and larger mainly to improve their endurance and the baby's comfort.

These strollers are often built with sets of dual wheels contributing to the overall bulkiness of the stroller.

Another drawback arises from the folding kinematic which causes a greater overall length when folded that in the unfolded position. This increase is due to the combination of the cross-shaped device closure in the horizontal plane, the folding movements of the guiding frame in the horizontal plane and the size of the wheels. Lastly, another drawback comes from the limitation imposed on the wheels' size to obtain reasonable compactness.

SUMMARY OF THE INVENTION

The invention overcomes the aforementioned drawbacks. The invention aims to be a folding bearing structure, used in particular in strollers, which will reduce the overall size of the folded structure to a minimum. In order to achieve this, the invention allows the wheels of the supporting structure to fold in a horizontal plane. In an enhanced embodiment, the invention provides a synchronization device for the various folding stages of the bearing structure and wheels.

The invention aims to provide a folding system resulting in a folded position in which the wheels are positioned in a horizontal plane, with said wheels being able to rotate in a quarter turn.

This proposal is an optimum alternative to a stroller using a central cross type width reduction folding system such as an umbrella stroller or a Maclaren™ branded stroller, but without its limitations.

Advantageously, the bearing structure comprises:
  a wheel assembly defining a first front wheels assembly and a second rear wheel assembly, the rear wheel assembly comprising at least two wheels spaced by a first width defining a first position;
  wheel supports connecting the axes of rotation of the wheel with the bearing structure; a first folding device enabling a first folding causing to the reduction in spacing between the two rear wheels to a second width lower than the first width, defining a second position.

Advantageously, connection means connecting the wheel supports of the first and second wheel assemblies to the first folding device, enable a second folding of the wheels so as to allow a rotation substantially equal to 90° of the wheels in the horizontal plane when the wheels are in the second position. Advantageously, the connecting means enable a driving of the second folding by the action of the first folding. Advantageously, the bearing structure comprises a guide frame enabling to guide the bearing structure when the wheels are in the first position. Advantageously, the guide frame comprises front arms, rear arms and handles and a second folding device enabling a third folding, driving the front and rear arms in a substantially horizontal plane.

Advantageously, the rigidizing means enable to hold the rear arms and the rear wheels in the same plane. Advantageously, the rigidizing means comprise a sliding horizontal bar and means for locking said bar to hold the rear wheels locked when the blocking means are activated in the first position and enabling to switch from the first to the second position when the first folding is actuated when the blocking means are deactivated. Advantageously, propagation means allow to synchronize the folding of the front wheel and rear wheel when folding when the second folding is enabled. Advantageously, propagation means enable to synchronize the first, second and third folding.

Advantageously, the propagation means comprise rods pivoting on themselves, said rods connecting the rear wheel supports to the front wheel supports of; at least one slider connection between the first folding device and the pivoting rods, said rods ensuring synchronization of the first folding and the third folding. Advantageously, the propagation means comprise at least a helical connection between the pivoting rods and the supports of the front wheels for synchronizing the first folding and second folding. Advantageously, the first folding device is a rotating central cross-type umbrella stroller, or more particularly of the type Maclaren™. Advantageously, first means for locking the position of the wheels allows the wheels to lock in the first position or the second position. Advantageously, the first locking means comprises an indexing system of holes positioned at 90°.

Advantageously, second locking means of the first position of the folding device and propagation means for synchronizing foldings help hold the desired structure in a folded position. Advantageously, the second locking means comprise:
- at least one ergot may be positioned in at least one eye of a pivoting rod, said rod being hollow; a push button for releasing a ergot with a hole.
- Advantageously, a device for synchronizing the rotation of the rear wheel support comprises, on each of the carriers, the translation of two points, a first point says "top point", form the upper end of a support and the other said item "lower point" forms a center of instantaneous rotation of the support when it is folded, the four points defined thereby forming a deformable isosceles trapezium of which the upper two points move horizontally during the folding/unfolding and the two lower are continuously at substantially the same distance.

Advantageously, the bearing structure comprises a stroller described in the present description.

Advantageously, the bearing structure of the invention comprises a frame comprising guide arm front, rear arms and handles and a second folding device allowing:
- A fourth folding bringing the rear arms in an intermediate plane which is intersecting the horizontal plane when the wheels are substantially in the horizontal plane, the latter position corresponding to a fourth position, the fourth folding being continued in its movement by:
- Fifth driving the rear folding arm in a substantially horizontal reference plane when the wheels are rotated through 180° so as to be in a plane perpendicular to the horizontal reference plane, the latter position corresponding to a fifth position.

The plane can be sequent in the case of the use of a gear a plane substantially at 45° from the horizontal plane.

Advantageously, the rigidizing means can hold the rear arms and the rear wheels secured to the rear arms in the fifth position.

Advantageously, the rigidizing means comprise a sliding horizontal bar and rigidizing means for locking said bar to hold the locked rear wheels when the locking means are activated in the first position and to move from the first to the fourth position when the fourth folding and the fifth folding are operated when the locking means are deactivated.

Advantageously, propagation means for synchronizing the folding of the front wheel and rear wheel when folding the fourth folding and fifth folding are activated. Advantageously, the propagation means allow the synchronization portion of the first folding and second folding with the other hand, fourth folding and fifth folding. Advantageously, the first locking means comprises an indexing holes positioned 180° system.

BRIEF DESCRIPTION OF THE FIGURES

Other features and advantages of the invention will appear on reading the following detailed description referring to the accompanying figures, which illustrate.

DESCRIPTION

Figures 3A, 3B:
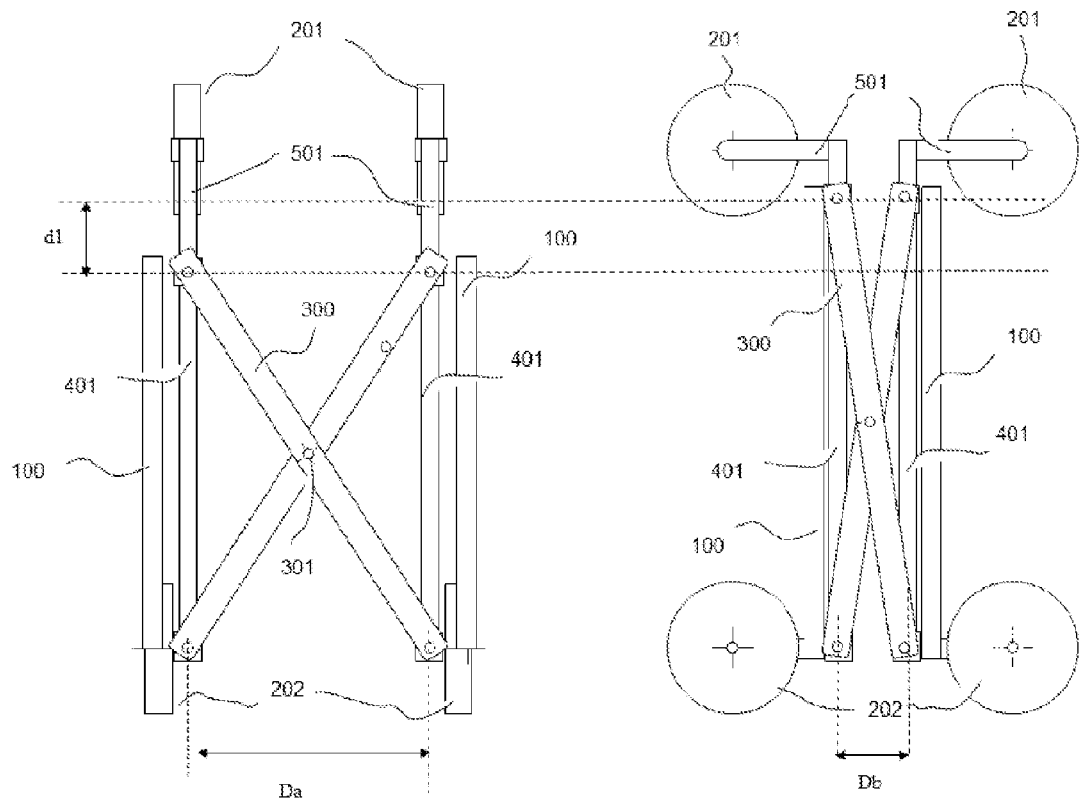
FIG. 3: Stroller comprising a folding device based on the invention.

FIGS. 3A and 3B show, in top view, a foldable bearing structure based on the invention. In particular, FIGS. 3A and 3B, show, more specifically, how such a structure can suitably be used in a stroller.

The stroller comprises a first folding device 300, also called central folding device, and a set of front wheels 201 and a set of rear wheels 202.

In one embodiment, the central folding device 300 is a folding cross rotating about its central axis 301.

The stroller comprises wheel supports 501 connecting the rotational axis of each wheel with the bearing structure.

The stroller comprises a guiding frame 100 shown in a top down view.

In one of the embodiments, the bearing structure comprises rods 401 for connecting the front wheels to the rear wheels, they are called in the following description the connecting rods. In an alternative, the central folding device 300 provides the function of connecting the front wheels to the rear wheels. The linking rods are optional and can help stiffen the supporting structure. Furthermore, in some embodiments the connecting rods contribute to the transfer of the kinematic enabling the synchronization of the foldings of the structure.

Figure 1A:
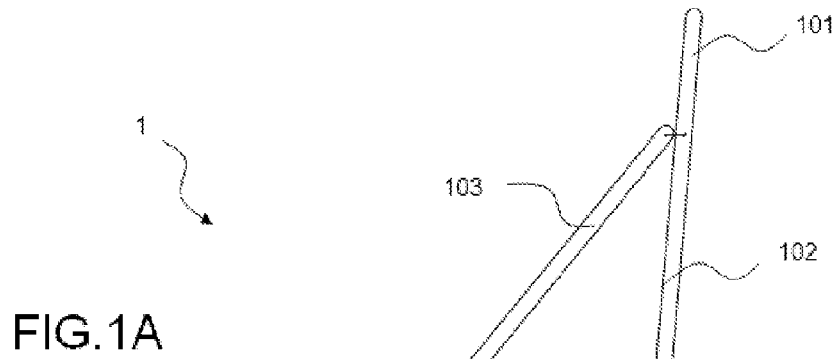
FIG. 1A, 1B, 2A, 2B: different views of a foldable stroller of the existing type.
Figure 1B:
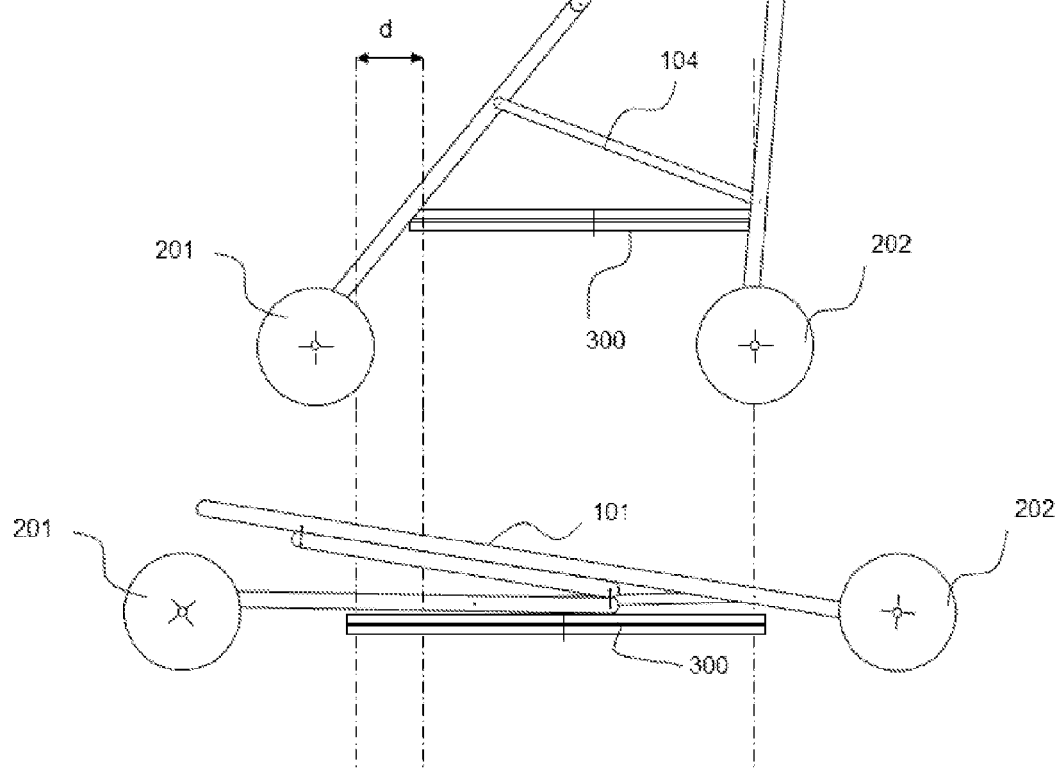
Figure 2A:
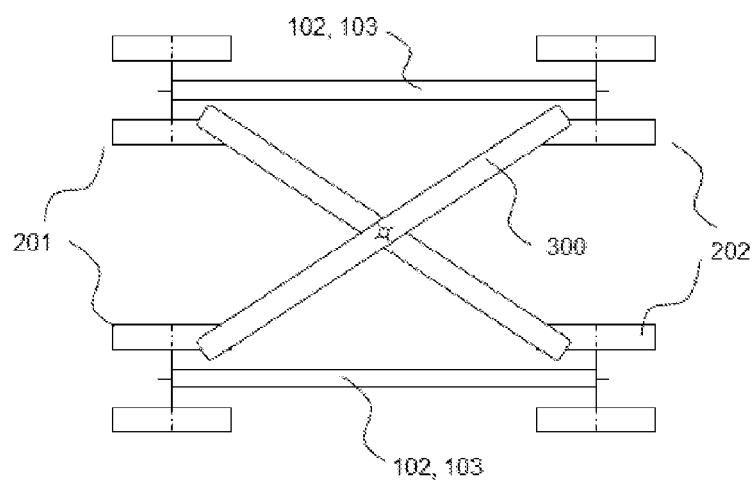
Figure 2B:
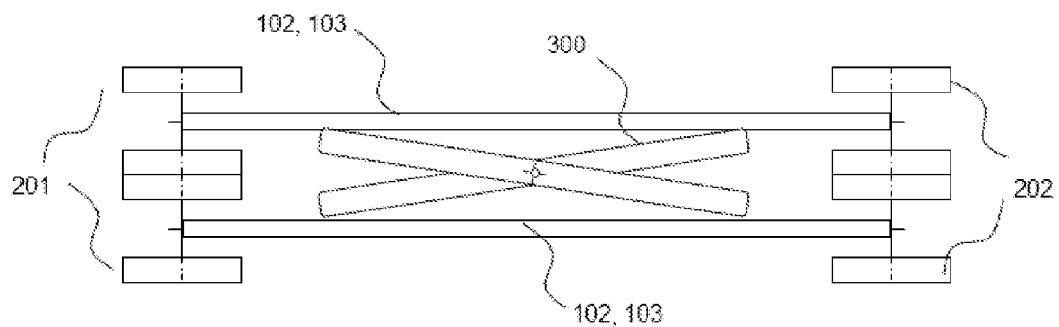

In this embodiment, rods 401 are positioned so as to secure the front wheels to the rear wheels. In alternative embodiments, the rear wheels may be fixed and single. Wheels are called "single" as opposed to the term "dual wheels" used in FIGS. 2A and 2B.

The invention allows to have wheel supports 501, 502, for example forming rods as shown in FIGS. 3A and 3B. In this latter case the rods are known as "support rods". The front support rods are referenced as 501 on the figures, and the rear support rods are referenced as 502. The support rods allow a rotation of substantially 90° so as to bring the front wheels and/or rear in the horizontal plane when the folding of the wheel is performed. The wheel support is integral to the wheel and turns with it during folding. The rods form a wheel folding device. Depending on the embodiments, the wheel folding device may comprise a structure similar to a rod.

A wheel locking system in a folded and/or unfolded position can be coupled to the wheels folding device.

The two rods 501 of the front support wheels can thus turn a quarter turn from a vertical unfolded position to a horizontal folded position. The rear wheels supports 501 may also be removable or foldable, and turn to be positioned in the horizontal plane.

The rear wheels supports 502 are attached to connecting rods 401 through "pivot" links causing the wheels to move from a vertical position to a horizontal position. These connections are called "folding connections." The wheel supports therefore have a degree of vertical rotation. The front folding connections are at a distance on the connection rod equal to the distance between the rear folding connections. In one embodiment, the rods can pivot on themselves and are secured to the wheel supports. The rotation of a connecting rod 401 at 90° mechanically causes the front and rear wheels on one side of the supporting structure to move in the horizontal plane. This is also a way to synchronize the front and rear wheels when the wheel supports are secured to the connecting rods.

In an alternative embodiment, the wheel supports can be directly connected to the central folding device. In this case, each folding link is located at the end of each arm of a foldable cross.

The rods of the wheel supports can be cylindrical in shape. Other types of sections of rods may be employed such as square or rectangular or a "spline shaft" section type may be used. An improvement is to add flanges at hinge joints, cylindrical flanges having at their center a hole corresponding to the retaining section.

The rotation of a quarter turn of the two support rods can be obtained in different ways according to the technical solutions employed in the invention.

In a first embodiment, a user manually performs the rotation of each support rod 501 and 502 respectively for all rear and front wheel support rods.

In this embodiment, an indexing system 601, 604, 602 can be used for its implementation. The indexing system comprises, in this mode, of two indexing devices 601 on each side preferably at the rear of the stroller. They can also be used at the front.

These indexing devices 601 can be either external or internal. When internal, the indexing device is integrated in the axis of each rod 501, 502 of the support with a push button on the axis end.

Figure 4A:
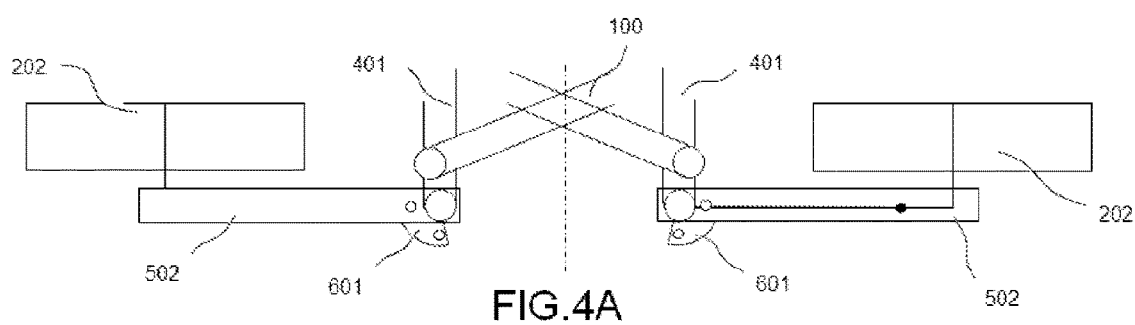
FIG. 4: an embodiment comprising an indexing system to hold the wheels.
Figure 4B:
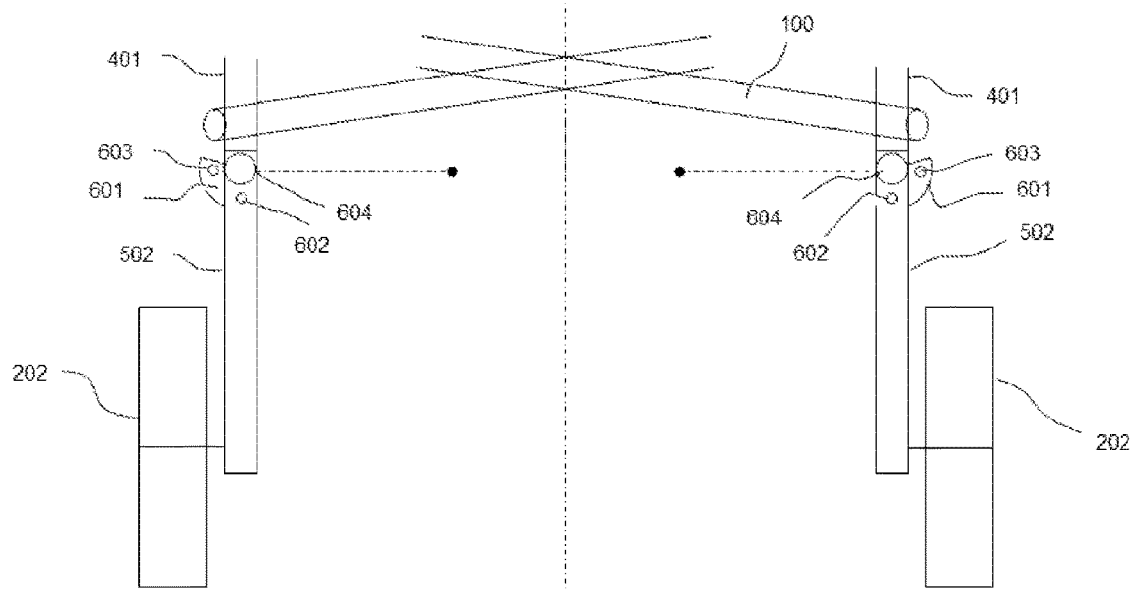

FIGS. 4A and 4B illustrate an indexing system external to the rod. A representative embodiment the rear wheels 601 comprises two sectors located at the ends of each of the wheel supports. Sectors can be compatible front wheels also.

The sectors 601 allow to enable or to block pivot connection 604 connecting the rods 401 with support rods 502, as shown in FIG. 4A or 4B.

In addition, each sector 601 will block the wheels in a folded or unfolded position. Each sector has two holes 602, 603 positioned at 90° corresponding to the folded position and the unfolded position of each wheel. FIG. 4A shows a folded position of the rear wheels of the stroller, and 4B, an unfolded position of the rear wheels of the stroller.

In another embodiment, the indexing device is arranged inside the wheel supports. When the wheel supports are hollow tubes, the indexing device is located inside the tube. The two holes are then positioned directly in the tube in which the lugs are inserted which the user can remove by a push button located for example, at axis end.

This embodiment has the advantage of simplicity of implementation and features improved ergonomics. Furthermore, this embodiment allows to keep the possibility of folding the stroller keeping the wheels vertical as required. The folding of the wheels then becomes optional. This mode is interesting when there is no need to reduce the overall height of the stroller to a minimum.

An embodiment which may be combined with other methods, may have controls on handle 101 to engage the folding of the wheels and if required the synchronizing device which will engage the other folding stages if the stroller. Remote folding commands on handles 101 can be implemented in different ways. A first example is a cardan joint, such as for example those used for roller shutters, provided on a handle used to initiate rotation of the rear wheels by a single action on a handle. Another example may be a derailleur or a simple gear system.

In a second embodiment, the bearing structure comprises means to fold the wheels and means to synchronize the different folding stages, in particular the one that allows folding the supporting structure from the center-folding device. In the example of a stroller, the folding of all wheels may be synchronized so that all the wheels rotate simultaneously and at the same angle when the folding of the wheels is engaged. Furthermore, in other embodiments described in the following description, the folding of the guiding frame and/or the folding leading to the decrease in distance between the wheels is/are synchronized with the horizontal/vertical/folding of the wheels.

We therefore consider the following different foldings:
the folding of the wheels to bring the wheels in the horizontal plane;
the folding of the frame allowing to fold back the frame in the horizontal plane and;
the central folding allowing to bring the wheels from one side to the wheels on the other side so as to reduce the width of the stroller.

The solutions described herein are solutions called "automatic folding" in which different synchronization means can be implemented to synchronize the above mentioned folding.

In a first embodiment of automatic folding, the bearing structure of the invention comprises helical ramps 701.

Figure 5:
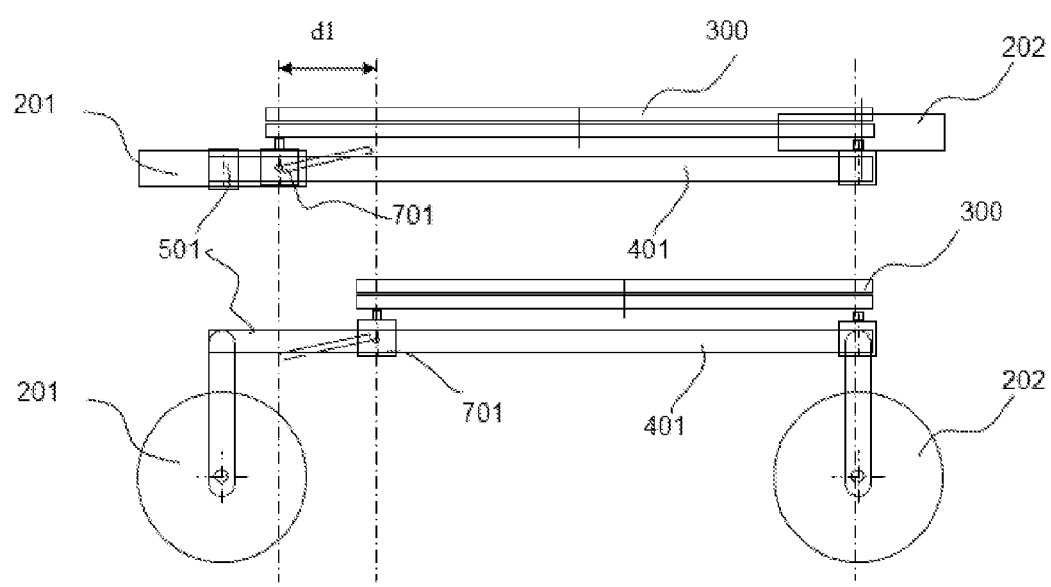
FIG. 5: an embodiment comprising a first helical ramp.

FIG. 5 shows a first type of helical ramps. In this example the central folding device is a foldable cross 300. The helical connection allows a connection in rotation and translation between the wheel supports and connecting rods. This connection can also be achieved when there is no connecting rod, with the central folding device 300. The helical ramps 701 thus enables a rotation of the front wheels while reducing the overall size of the wheels at the front of the stroller, as the total length of the stroller is not increased. FIG. 5 shows such a stroller, in side view, in folded and unfolded positions.

This solution allows to transfer a part of the variation of distance Da-Db, shown in FIG. 3, the width of the strollers between the folded and the unfolded position, to the change of the distance d1 in the position of the front wheels in the length of the stroller. This length d1 can then be of the order of 8 to 10 centimeters.

The presence of tubes allows for the front and rear wheel supports to become fixed. Therefore, an advantage of this embodiment results from the fact that as the rear wheels are blocked in longitudinal movement, the entire value of rotational displacement is transmitted to the sliding of the front link and to their rotation in the horizontal plane.

This solution allows a movement of the joint formed by a helical ramp 701 resulting in a displacement of the lugs in the ramp. The ramp can be dual, that is to say it is located on each side of the stroller at each of the connecting rods 401. Using a dual ramp helps balance the efforts.

A first embodiment is to hollow out, according to the desired profile, tube 401 which serves as link rods.

Figure 6:
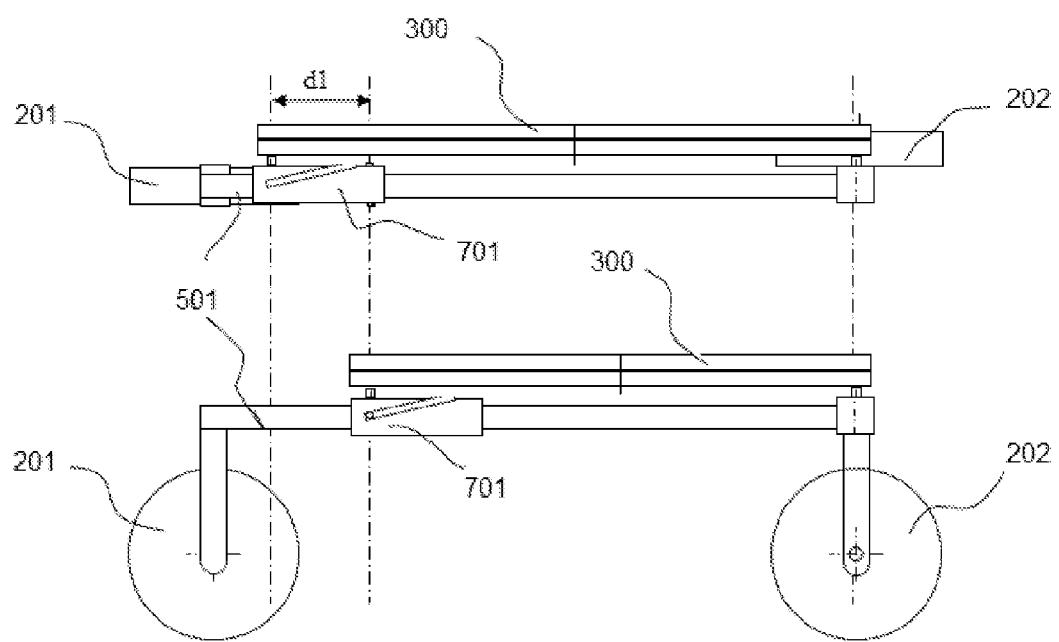
FIG. 6: an embodiment comprising a first helical ramp.

A second embodiment consists in that the lugs are, instead, integral to the axis of tubes 401 and they slide in ramp 701, which moves, towards the front wheel support, of a sufficient distance as to integrate the helical ramp. This solution is shown in FIG. 6. This also avoids the weakening of the front part of the tube.

In these last two embodiments, the synchronization device will synchronize the following:
the folding of the wheels allowing to bring back the wheels in the horizontal plane and;
the central folding allowing to bring the wheels from one side towards the wheels on the other side so as to reduce the width of the stroller.

In addition, this synchronization device can be combined with a device including additional connections to increase the rigidity of the stroller.

The synchronization device made from the helical ramp of a stroller may be sized so as to design the profile of the ramp to correspond to the overall kinematic folding/unfolding of the stroller including the device realized by the central folding.

In an improved embodiment, the guiding frame comprises rear arms which may fold in width, for example in a rotation by means of a foldable cross similar to the one which may be used for the center-folding device, and fall back on the wheels. A solution which can then be used allows to change the rotational movement of the rear arm of the stroller into the rotation of the axes of the connecting rods, in particular by a pivot connection. The wheels being fixed to the axes, the rotation of the connecting rods of a quarter turn causes the rotation of the wheels in the horizontal plane.

The synchronization devices thus allow in this case to synchronize the following:
the folding of the wheels bringing the wheels in the horizontal plane;
the folding of the frame allowing the frame to fold back in the horizontal plane and;
the central folding bringing the wheels from one side towards the wheels on the other side so as to reduce the width of the stroller.

The invention brings an advantage in the convenience of folding a stroller for which the folding of the guiding frame causes all other foldings.

In a second embodiment of automatic folding, the bearing structure of the invention comprises gears. The gears allow, in particular, to easily convert the rotational movement of the rear arms of the stroller into a rotation of the connecting rods which are fixed to the wheel, through angle transmission gears located on the rear articulation arm.

Figure 7:
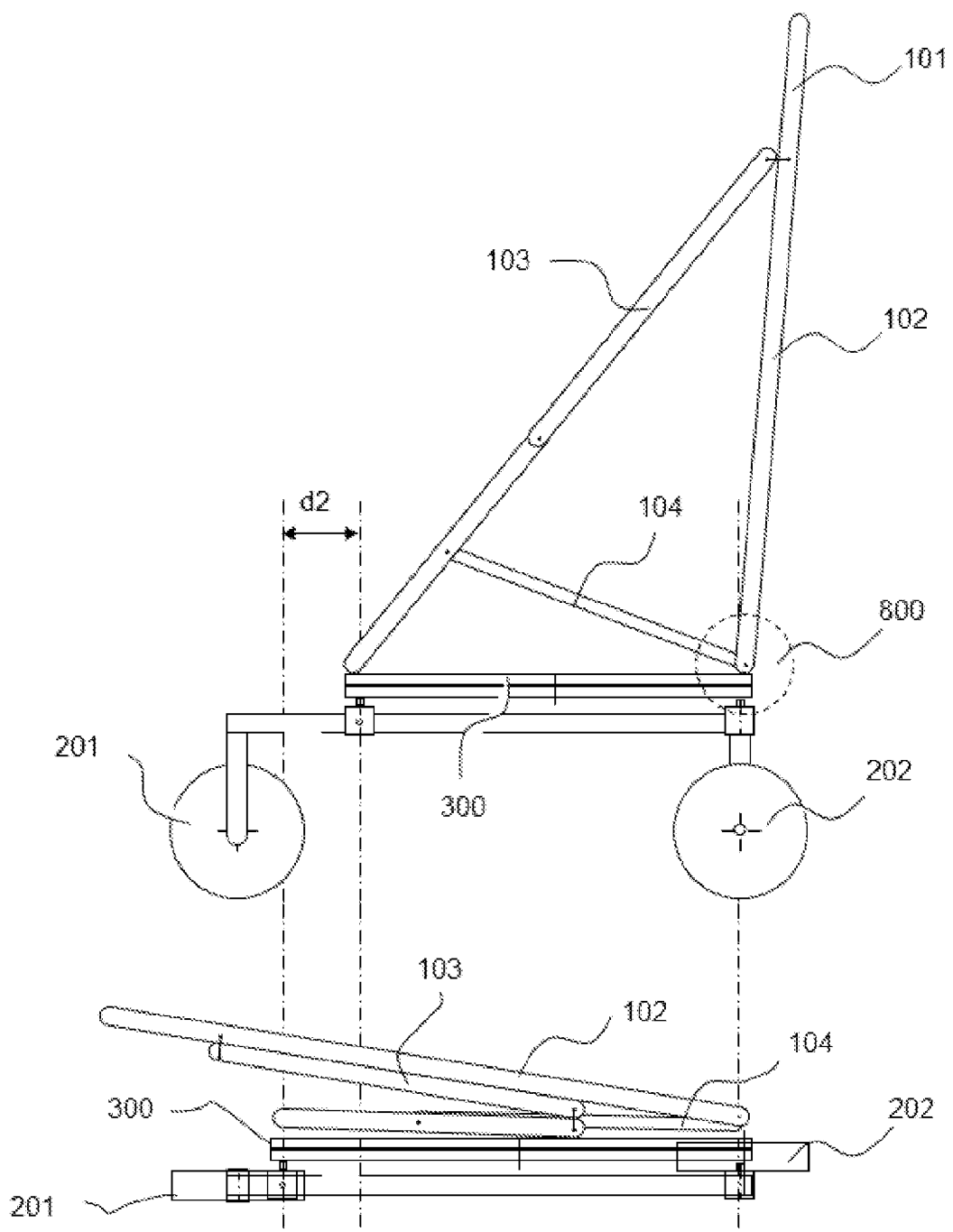
FIG. 7: an embodiment comprising gears.

FIG. 7 shows a stroller comprising such gear positioned in region 800 at the junction of rear arm 102 of the guiding frame and central folding device 300.

In a first embodiment of this second variant, the angle transmissions can be made by bevel gears. In this case, for example, the gears may have twenty teeth and have an outer diameter of about 40 mm. This thus results in that the two axes of rotation intersect at a distance of the order of the size of the gears, which is 40 mm.

An alternative of this first embodiment comprises two angle transmissions with helical gears with crossed axes.

Figure 8:
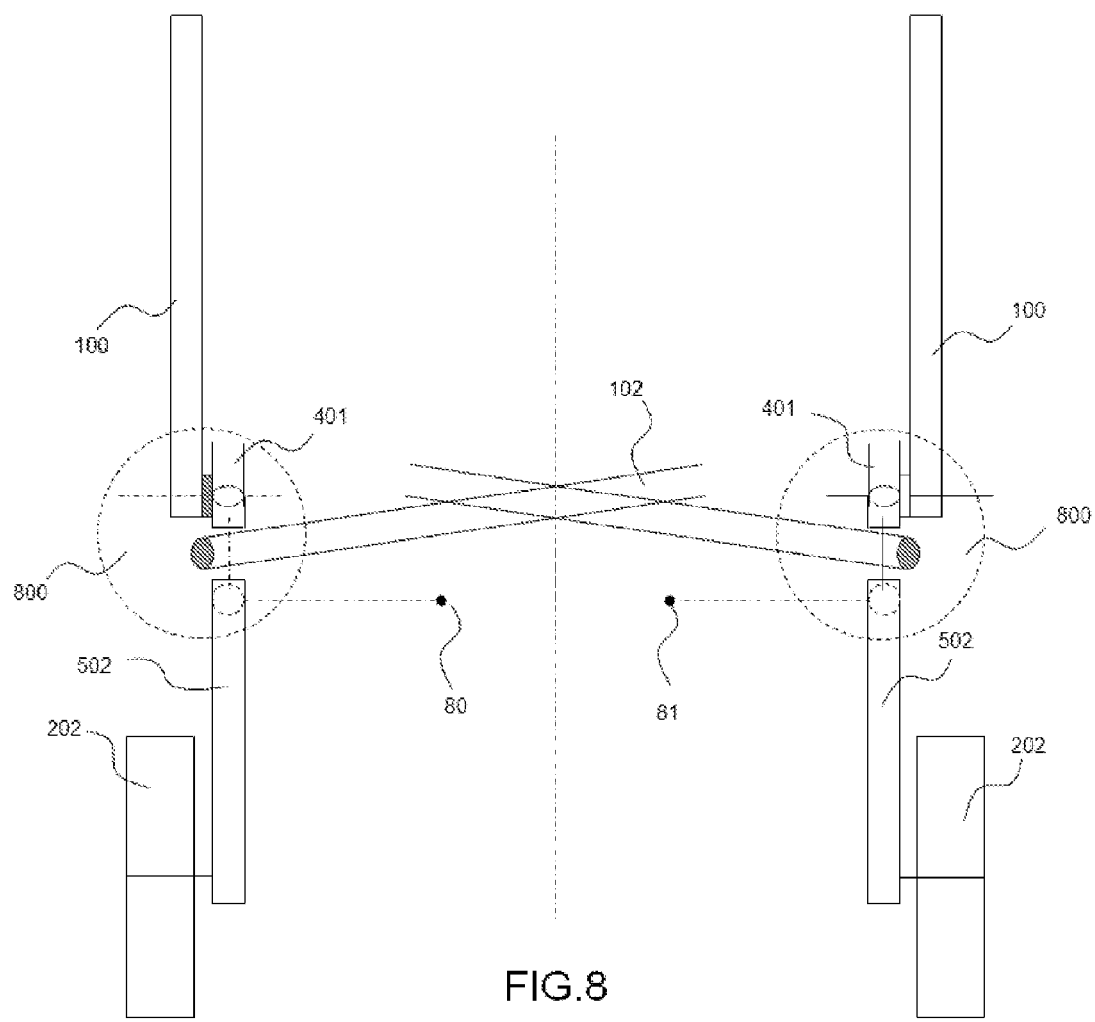
FIG. 8: an embodiment comprising a first arrangement of gears.

FIG. 8 shows a configuration in which the gears within area 800 are used to position the wheel mounts 502 in the extension link rods 401. This figure does not take into account the position offset required between the rear arms and the link rods due to the presence of gears.

The gears are used to transmit a rotational motion of the rear arms 102 into a rotational movement of the wheel supports 502 in a horizontal plane.

Figure 9:
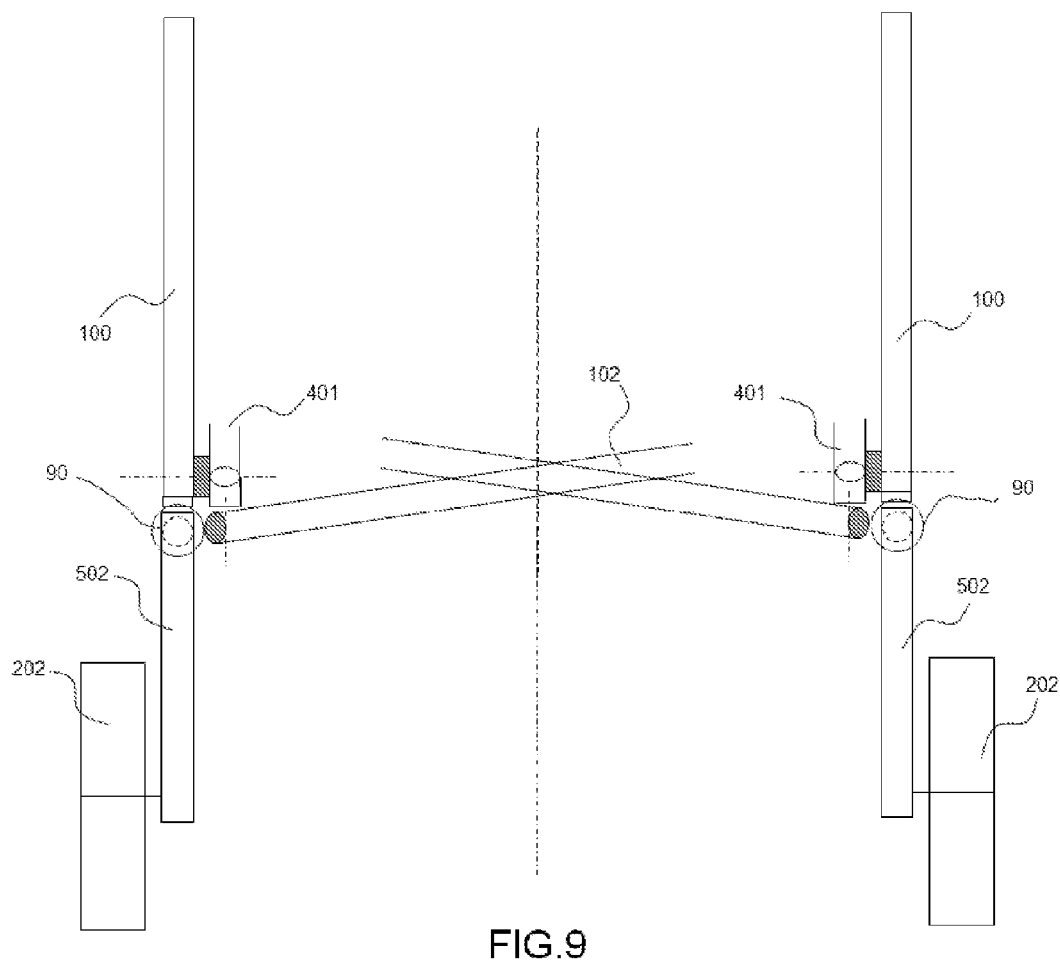
FIG. 9: an embodiment comprising a second arrangement of gears.

FIG. 9 shows an embodiment wherein the upper ends 90 of rear wheel supports 502 are positioned to be displaced vis-à-vis of the connecting rods 401. In FIG. 9, they are shown in vis-à-vis the guiding frame rods 100 of the stroller and situated in a vertical plane in the longitudinal direction of the stroller. This embodiment can take advantage of minimal space to position the gears. Indeed, this latter mode necessarily shifts the axes of the rear arms which transmit rotational movement to the wheel supports. Thus, optimally the movement of rear arms 102 causes the rotation axes of wheel supports 502 in the horizontal plane. The distance between the two axes, the arms and supports, rotating through the gear is in the order of 40 mm for a stroller. This distance corresponds to the selected gears sizing.

Advantageously, the gears are selected so as to operate on a quarter turn on a part of the useful area of the gear. The conversion ratio of the movement of the gear can be selected equal to 1:1 to the extent that the next expected quarter turn, the rear arms perform a quarter turn further forward to be folded in the horizontal plane. So this choice is consistent with a rotation of the rear arm 102 and a folding of the frame in the horizontal plane, of a rotation of approximately 90°. In an alternative embodiment, the implementation of the gears can be located at the front of the bearing structure and/or of the stroller.

It is also possible to make a solution in an equivalent manner to a gear operator solution on the basis of a hinge 1070 whose axis 1071 is placed in the bisecting plane 1072 of the variable angle in question.

Figure 29:
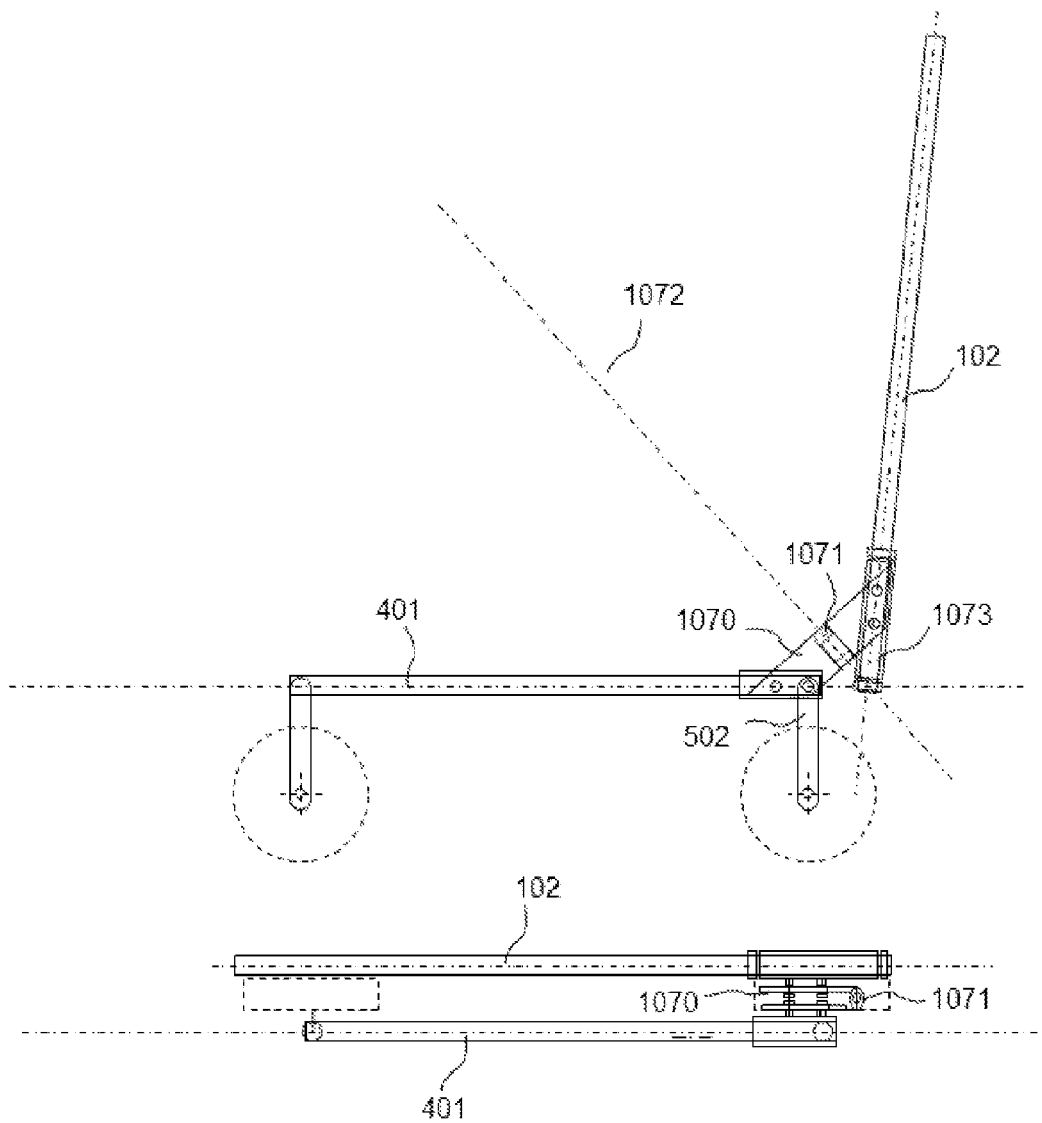
FIG. 29 à 33: an embodiment showing a way to fold the wheels at a 180° angle, in order to offer an alternative to decrease the size of the stroller in folded position.

FIG. 29 illustrates this embodiment in which are referenced the items described.

Hinge 1070 connects on the one hand the axis of rotation which actuates the rods of wheel supports 502 and on the other hand the arm in question, in this case the rear arm The hinge is positioned in the bisecting plane of the angle where the two following axes intersect:
On the one hand axis 102 corresponding to the rear arm of the stroller in FIG. 29 and;
on the other hand, axis 401 corresponding to the link rods.

The axis of hinge 1071 is positioned on a bisector 1072 secant with the two axes 401 and 102. By way of example for a 90° angle between the two axes, the bisector is 45° with respect to each axis.

When the angle between both axes is 96°, the bisector is 48° from each of the axes 401, 102 as shown in FIG. 29.

When the stroller is unfolded, the hinge is open at 180° in a vertical plane.

When the stroller is folded, hinge 1070 is closed and positioned horizontally.

In the open position, by actuating the rear arm 102 forward, hinge 1070 will gradually fold towards the inside of the stroller from the vertical position to the horizontal position which will automatically produce a 90° rotation of the axis fixed to wheel supports 502.

This rotation will also apply to rear arm 102 which is possible for example by binding this rotation with the rotation of the handles of the stroller. In this embodiment, hinge 1070 is attached to the rear upper arm 102 by a sleeve 1073 which allows the free rotation of rear upper arm 102 in this case made in the shape of a tube.

Sleeve 1073 is positioned on the tube by being forced by two rings at each end. Thus, unlike the axis fixed to wheel supports. 502, rear arm 102 is not subject to the rotation, which also solves the particular implementation of the device 102 which holds in parallel the two rear arms.

An articulated elbow can be specifically developed to perform this function while also incorporating:
  the opening abutment of the hinge at a 180° angle;
  Holding the longitudinal positioning of the sleeve on the tube by a lug moving in a quarter round opening;
  An additional lock between the lower part of the back arm or its extension with the axis of rotation of the wheel support and the wheel support in a final open position through a lug coming in a hole or 2 interfacing parts.

As for the gear solution, this solution can also be applied to the front of the foldable bearing structure and/or stroller on a near 45° angle.

Other alternative embodiments can be combined with previous methods. In particular, the invention also relates to additional devices to increase the rigidity in particular of the bearing structure or of the stroller in its unfolded position. These devices avoid having the weight of the structure and efforts related to the kinematics of folding and unfolding resting on the teeth of the gears.

In a third embodiment of automatic folding the supporting structure of the invention comprises means of mechanical connections ensuring the synchronization therebetween foldings wheels and their synchronization with other foldings of the bearing structure.

A first embodiment comprises a synchronization device 900 located at the rear of the bearing structure.

We call track width, the distance between the wheel tracks when the bearing structure is unfolded and rolls on its wheels. This is the maximum width of the stroller when it is unfolded. Synchronization device 900 ensures the spacing between the two rear wheel supports is fixed. This spacing corresponds to the track width of the bearing structure. Furthermore, the synchronization device also ensures the supports lock while realizing the abutment at 90° so that the wheels do not fall towards the inside of the bearing structure. This configuration allows the wheels to be protected in particular when such a stroller is folded or transported lying on the floor.

Figure 10A:
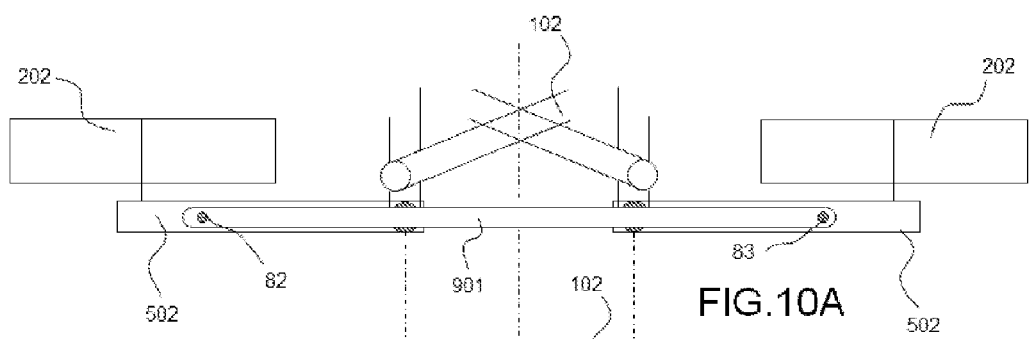
FIG. 10A, 10B: an embodiment comprising a first synchronization device of the folding devices.

FIG. 10A shows a first rigidizing device 900 which is connected to the two rear wheel supports 502 on both sides of the bearing structure.

To maintain the spacing between the two wheel supports 502, a rigidizing device 900 can be combined with the synchronization devices of the supporting structure of the invention. Rigidizing device 900 may comprise, for example, a bar 901 positioned horizontally between the rear wheel supports whose length is substantially equal to the dimension of the track. Bar 901 is pivotable at both ends, which are connected to wheel supports 502 in a particular point, called the lower pivot point. Bar 901 therefore shares two "pivot" type links, with each support 502.

Bar 901 also ensures keeping a fixed distance between the rods when a locking system can be associated with the rigidizing device. However, when rotation of wheels 202 is engaged, it is found that the space between the link rods is reduced in FIG. 10A while the horizontal rod remains horizontal but is located in the plane of the connecting supports when folded.

In addition, the bar is positioned at an optimum height in order that in folded mode, it is compatible with the closing angle of central cross 102 of the guiding frame.

Figure 10B:
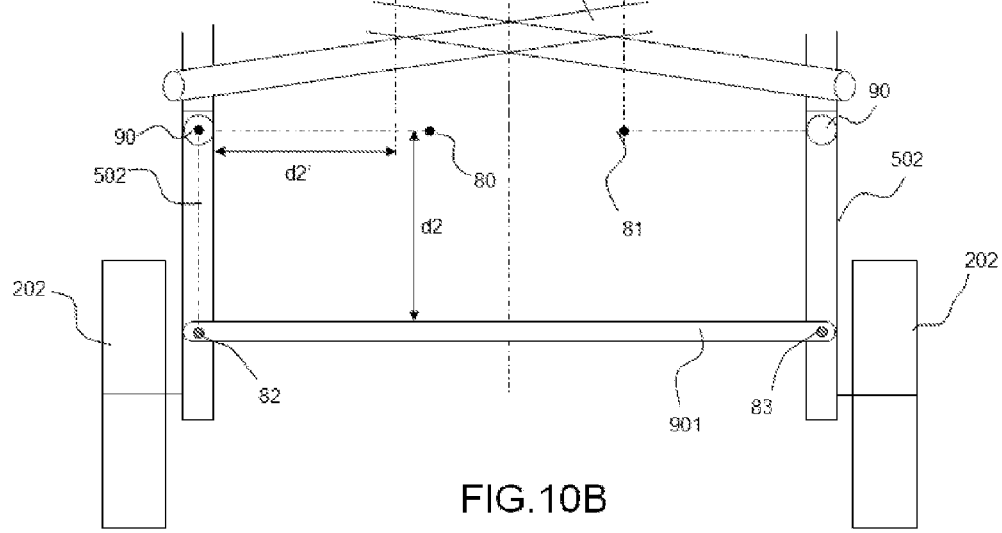

FIGS. 10A and 10B show the folded and unfolded configurations of this embodiment. It is understood in FIG. 10B that distance d2 between bar 901 and the horizontal axis of rotation of the wheels supports 502 must be substantially equal to the variation of distance d2' between the wheel supports rods from a folded and unfolded position.

The two ends 90 of wheel supports 502 form with points 82 and 83 a deformable quadrilateral when the structure is folded or unfolded. Points 82 and 83 are defined so that the wheel supports can rotate about their central pivot connection 90. Points 82, 83 follow, during folding, a path forming an arc of a vertical helix whose axis passes through the center of the central cross which is in this case the central folding device. Points 82 and 83 get close to points 80, 81. Movement of the wheel supports is performed while keeping the distance between points 82 and 83 constant and defined by the fixed length of rod 901.

The characteristics of the deformable quadrilateral defined by the invention are that:
  The lower base has a fixed length substantially equal to the width of the stroller plus or minus the wheel offset;
  The upper base is horizontal and variable with the action of folding the bearing structure;
  The sides of the quadrilateral have a fixed length and are equal to the half variation in width obtained through the folding/unfolding device between the folded position and unfolded position.

It is necessary to limit the rotation of the wheel supports to a quarter turn to avoid damage through free rotation. To overcome this drawback, the abutments to 90° angle may be used. Alternatively an indexing device can be used with the same function. The quadrilateral becomes a rectangle when the structure is in the unfolded position.

In the case of angle abutments, one solution is to integrate them in the pivotal connections between the wheel supports and linking rods or with the center-folding device.

Figure 11:
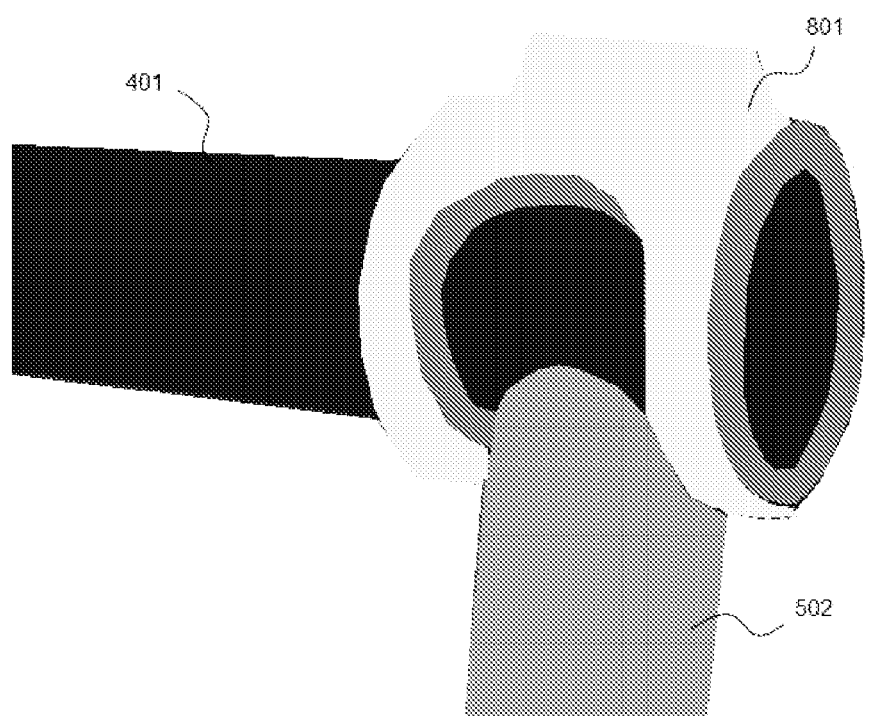
FIG. 11: a pivot connection to limit the rotation of the wheels.

FIG. 11 shows such a connection incorporating an abutment to 90°. The rotational movement of wheel supports 502 is then blocked in rotation. The linkage may also comprise longitudinal stops, such as edges as shown in FIG. 11. Edges can block the movement of the wheels along the longitudinal axis of the stroller.

The example of the stop of FIG. 11 provides an abutment for the free upper left corner and upper right corner to prevent becoming less than 90°. The combination of restrictions keeps all the rods at a right angle in the unfolded position.

One advantage of these solutions is the safe use of synchronization devices associated with foldable bearing structures.

In enhanced mode, a compass device can be attached to horizontal bar 901 so as to reduce the slack of the synchronizing device 900.

Figure 12:
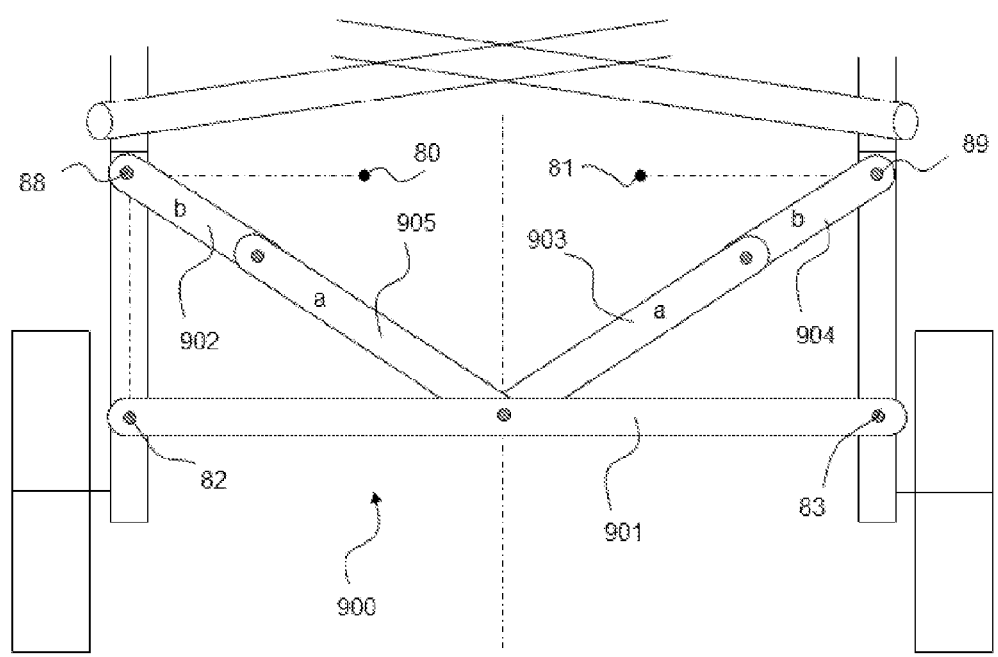
FIG. 12: an embodiment comprising a second synchronization device to synchronize foldings.

FIG. 12 shows a compass device of the invention which comprises a horizontal bar 901 and bar 902, 903, 904 and 905. The bars arrangement is optimized by the length of each bar, their position and their connection relative to each other. FIG. 12 shows an example of implementation of a compass device.

Let "a" be the length of rods 903 and 905 and "b" the length of rods 902 and 904. If "h" is the distance between bar 901 and the pivot connection of each wheel support, and "v" is the width of the track, we have the following relationships:

$$(a+b)^2 = (\tfrac{1}{2}v)^2 + h^2$$

$$a - b = h$$

Adequate choice of the rods length for the compass device and their arrangement enables a configuration that holds the structure of the frame in particular the unfolded guide frame. When the mechanism is unlocked or freed, the compass device can advantageously provide a simple and compact folding.

Another embodiment provides an improvement of the synchronization of the wheels folding together and/or folding of the wheels with other foldings.

Figure 13A:
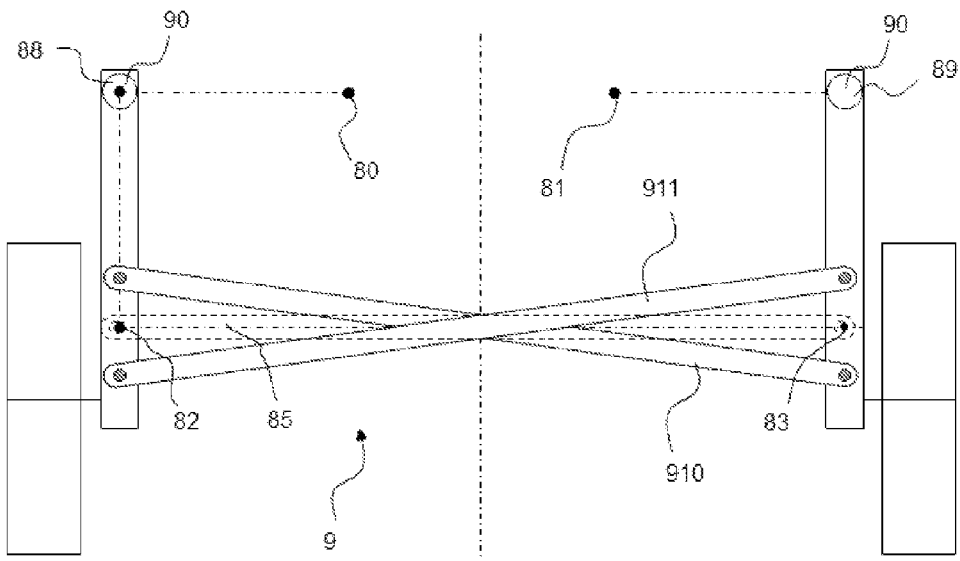
FIG. 13A, 13B an embodiment comprising a third synchronization device to synchronize foldings.
Figure 13B:
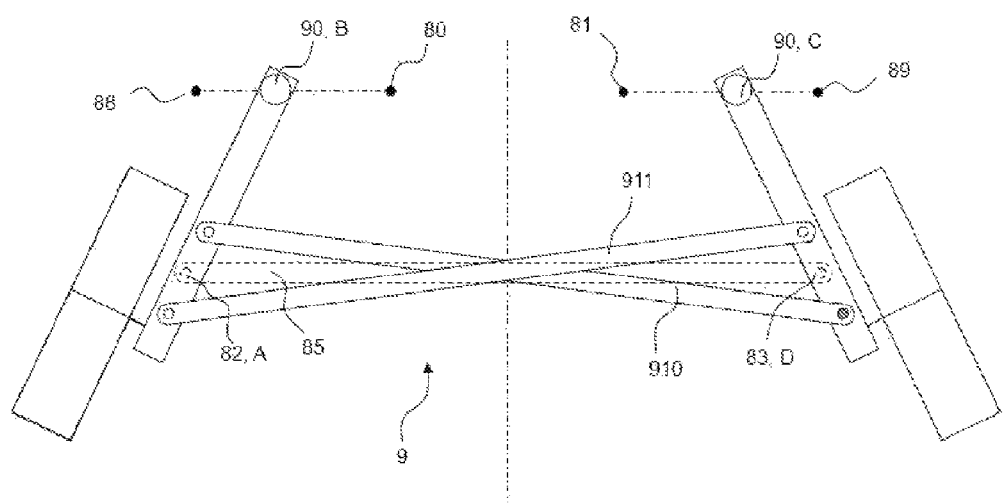

In this improved method, the horizontal bar is replaced by a system of cross-bars 910, 911 as shown in FIGS. 13A and 13B.

When the system of bars 910, 911 comprises two bars, they are preferably positioned slightly diagonally and substantially in place within a few centimeters in height from each other, thereby forming an anti-parallelogram.

This positioning ensures the synchronization of the rotations of the left and right wheels. The rotations are performed around imaginary axes centered on 82 and 83 respectively. Displacement of the wheel supports are made either as an arc or a combination of a circular arc and a translation. axis 85 is shown for reference only, this axis connects the two axes of rotation of each wheel support.

The ends of wheel supports 90 get closer to each other in this case, each moving along an arc of a vertical helix whose axis passes through the center of the central foldable cross. Ends 90 of the wheel supports pivot to positions 80, 81 respectively when the stroller is folded.

Synchronization of left and right wheels is achieved thanks to the geometrical properties of the selected four-bar linkage forming a deformable anti-parallelogram. The link imposes identical angles of rotation to the right and left due to its symmetry.

The compass device combined with the abutments of FIG. 13, prevents the angle between the support rods and the rods of links to become greater than 90°. The combination of the two compass represented in FIG. 14 also keeps the assembly as a rectangle.

Both devices, compass and abutment are complementary and can be used independently of one another.

The abutment device of FIG. 13 is used to lock the sliding axis in the folding connections.

The anti-parallelogram also fills the function of the crossbar which it replaces in an almost equivalent way:
  in the folded position, the distance between the two joints of the horizontal bar point is substituted for the diagonal bars of the anti-parallelogram;
  in the unfolded position, the distance between two pivots of the replaced horizontal bar point is the width of the track.

In FIG. 13A, a proportion of the anti-parallelogram with a ratio of between 1 to 7 was selected:
  this allows to have a difference of 1% between the two values; the hypotenuse length of a right triangle of base 1 and height of 1/7 is the square root of 1+1/49=1+2% equal to 1+1% times the base.
  to keep a spacing of a few centimeters between the foldings links FIG. 13B shows the synchronization device of the folding of the wheels when the wheels are partially folded. It is noted that axis 85 drawn in dotted line shows that there are two points of wheel supports 82, 83 whose distance remains fixed. This fixed distance is symbolized by the theoretical horizontal bar 85.

One of the principles of the invention relies on the fact that there is a point on each support which combined with the two points forming the ends of each support, define a deformable isosceles trapezium ABCD The deformable quadrilateral of the embodiment of 10B is a theoretical trapezium in this embodiment. A peculiarity of this trapezium is that it deforms while remaining isosceles during folding. This trapezium exists in theory for each of the embodiments of the presented invention from the moment the two points 82, 83 are theoretically built on the wheel supports.

The trapezium has two ends which move along a horizontal line between points 88 and 80 on the one hand and 81 and 89 on the other hand.

Figure 14:
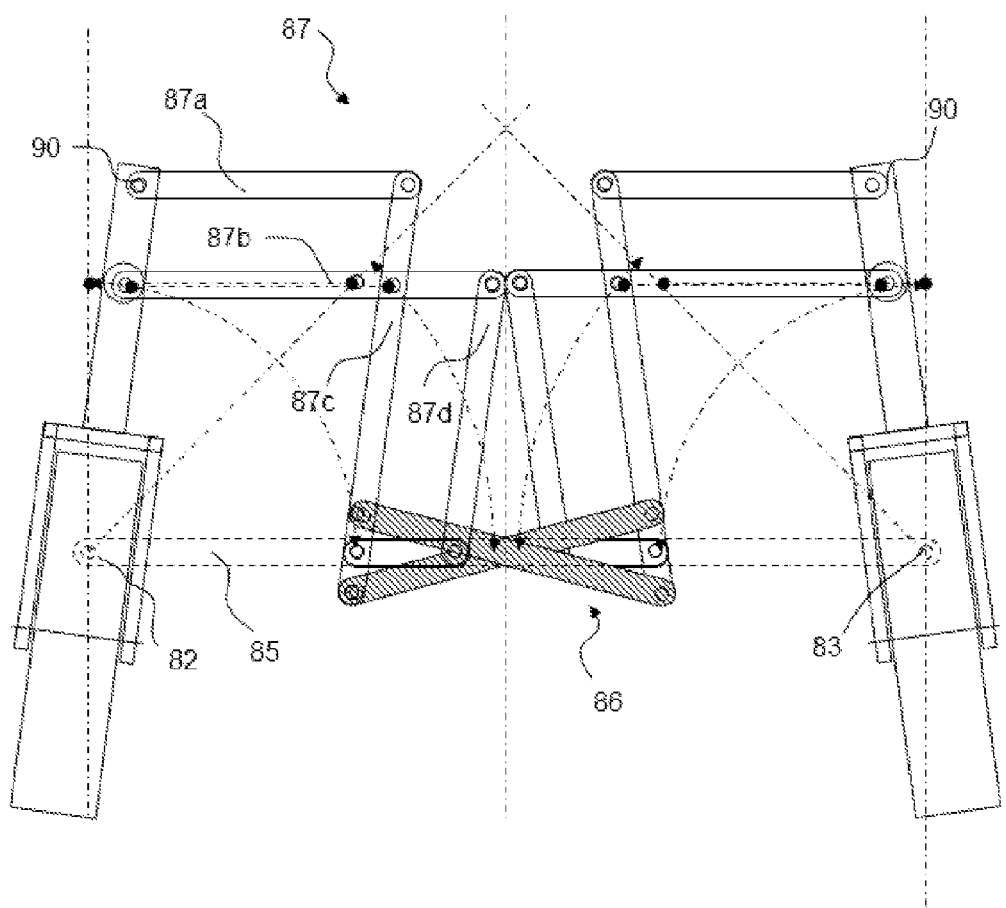
FIG. 14: an embodiment comprising a fourth synchronization device to synchronize foldings.

FIG. 14 shows another embodiment which is an alternative when the wheels are of a larger size. The rotation of the wheel supports is still calculated from the theoretical point of rotation 82, 83 which are obtained according to the dimensions of the wheel supports and the width of the supporting structure. In this example, a mechanical coupling system 87 can replace a compass system. The mechanical coupling 87a, 87b, 87c, 87d shown in one side of the structure (left side) are necessarily fixed atop the wheel supports. This constraint results from the height of the wheels. However, the mechanism can provide a new anti-parallelogram 86 whose axis of rotation lies on axis 85 between theoretical points of rotation 82 and 83 of the wheel support.

As in FIGS. 13A and 13B, a deformable trapezium is defined by the two ends of the wheel supports and theoretical points on the wheels which are centers of instantaneous rotation of each wheel support during folding or unfolding. Thus the wheel folding is synchronized at the rear.

The deformable trapezium has a fixed distance between the two points 82 and 83 and a horizontal displacement of the upper two vertices 90.

In order to ensure synchronization of the right and left wheels, other systems may be used in the invention. Alternatively, the "right-left" synchronization may be provided by a double articulation.

Figure 15:
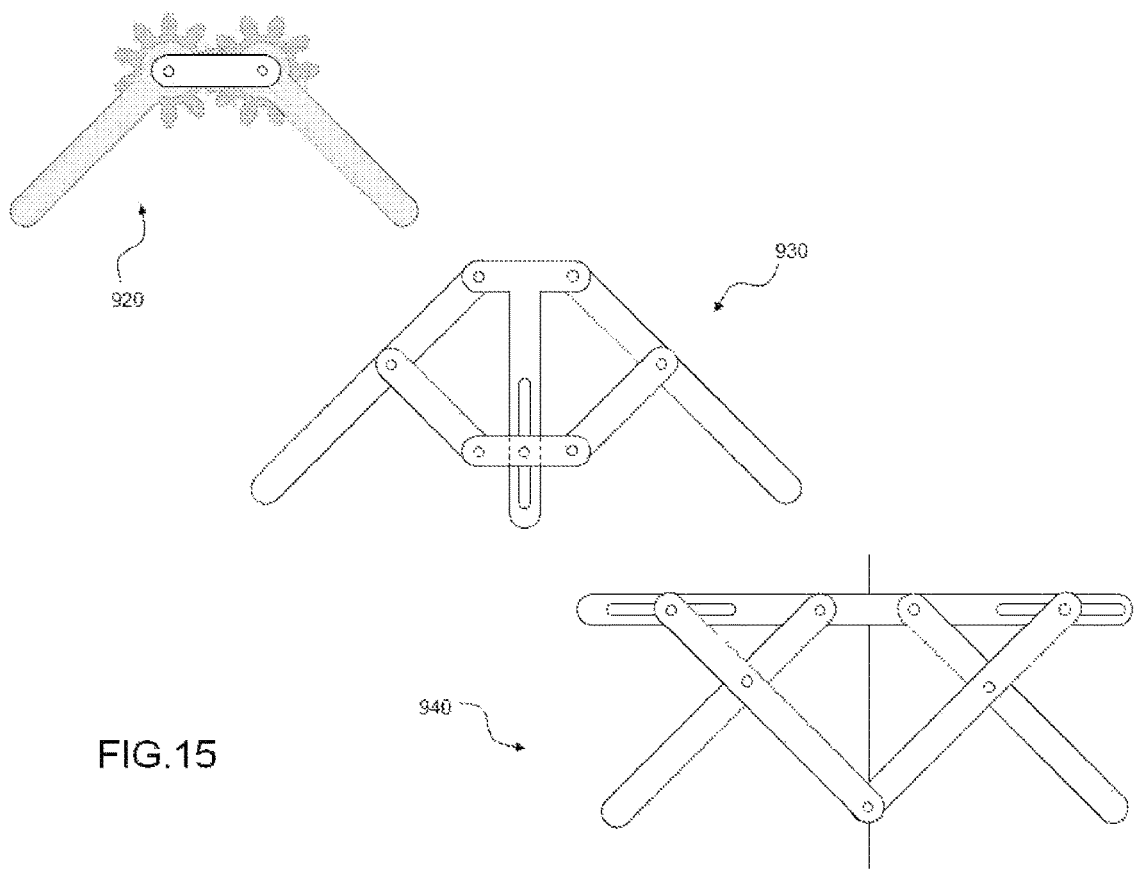
FIG. 15: Three alternative devices to help synchronize the foldings.

FIG. 15 shows an embodiment of a double articulation comprising gears 920, another embodiment 930 comprising a double articulation with bisector axis and finally to a variant of this embodiment comprising a dual sliding 940 to optimize the arrangement of the synchronizing device with a minimum height requirement.

Other alternatives may be used, including a synchronization device comprising only axial links.

In another embodiment, both of the sliding movements of device 940 in FIG. 15 may be replaced by a mechanism guiding in a straight line the central point. These mechanisms can be straight line linkage such as Peaucellier, Kempe, Watt or Roberts mechanisms.

Figure 16:
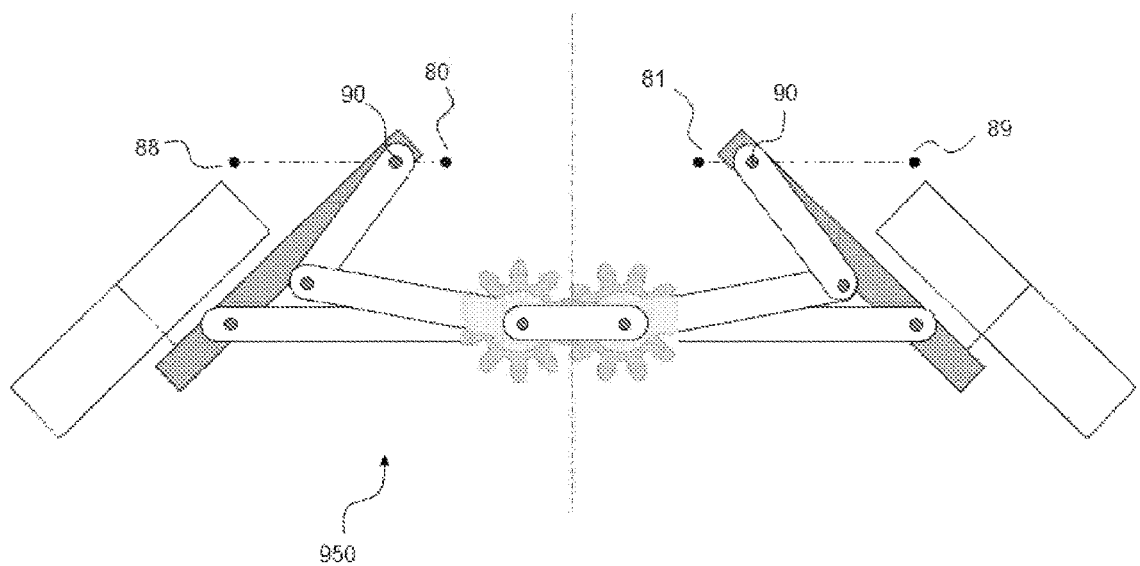
FIGS. 16 à 28: Other embodiments of devices to synchronize foldings.

FIG. 16 shows an embodiment wherein a synchronization device comprises a double articulation for synchronizing two compasses and therefore the rotation of left and right wheels. This device allows the ends of the wheel supports to move horizontally on the one hand between points 89 and 81 and on the other hand between points 80 and 88.

In the example of this latest embodiment, shown in FIG. 16, a distance of 40 mm between the two articulations is selected and the choice of the profile is a gear with 10 teeth gear unit 4. These are adapted to the pitch of 40 mm and ensure that no tooth jump.

In this last example, only one part of the gear is required in this application to generate a quarter turn movement.

Teeth can be cut directly in the connecting bar between which is shown in FIG. 16 between the 2 gears.

Figure 17:
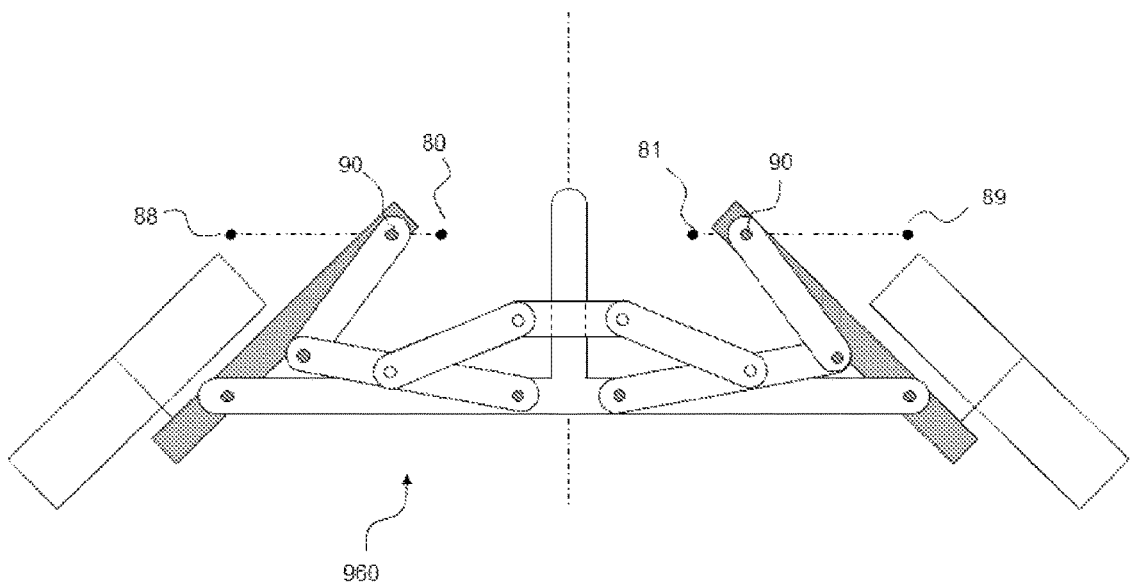

FIG. 17 shows a synchronization device 960 without gears with vertical sliding mechanism.

Figure 18:
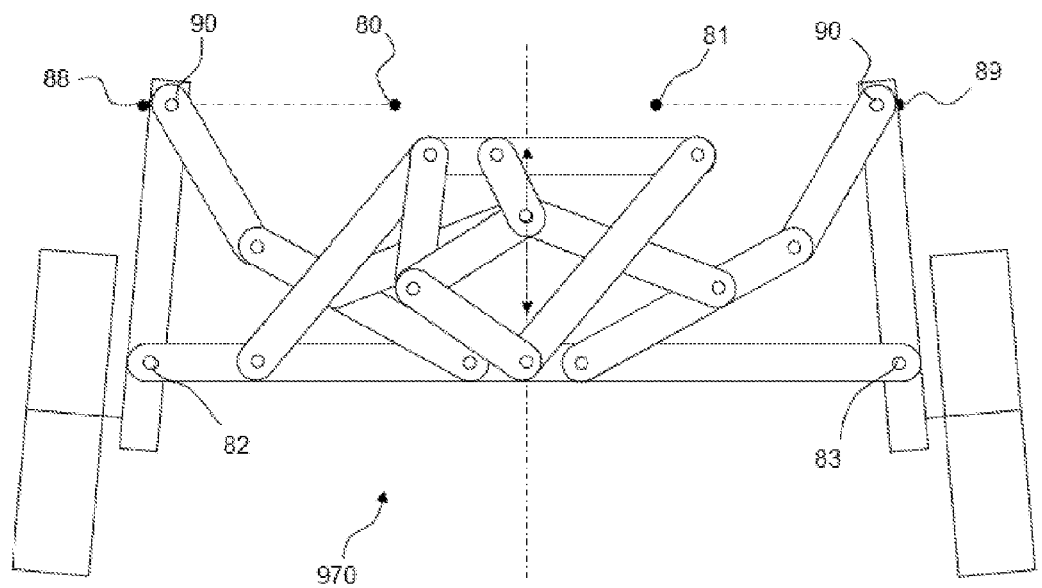

FIG. 18 shows a gearless slidingless variant on the basis of a straight line linkage from Kempe.

For the realization of these latter embodiments, it is necessary to construct as many overlapping planes as there are connections bars. Indentations can be integrated in the connection bars to the passage of the pivots and/or adding U-profiles.

To keep the vertical plane of the mechanism, such as that of FIG. 18, a horizontal bar may be used such as that of the device of FIG. 10B.

According to an alternative which may be combined with the preceding embodiments, the synchronization device may also be connected to the folding device of the frame such as a central cross.

In order to stiffen the frame holding the guiding device and the synchronization device, the invention allows to create a fulcrum, when not there already mechanically to realize the connection between the wheel supports and the guiding frame.

Figure 19:
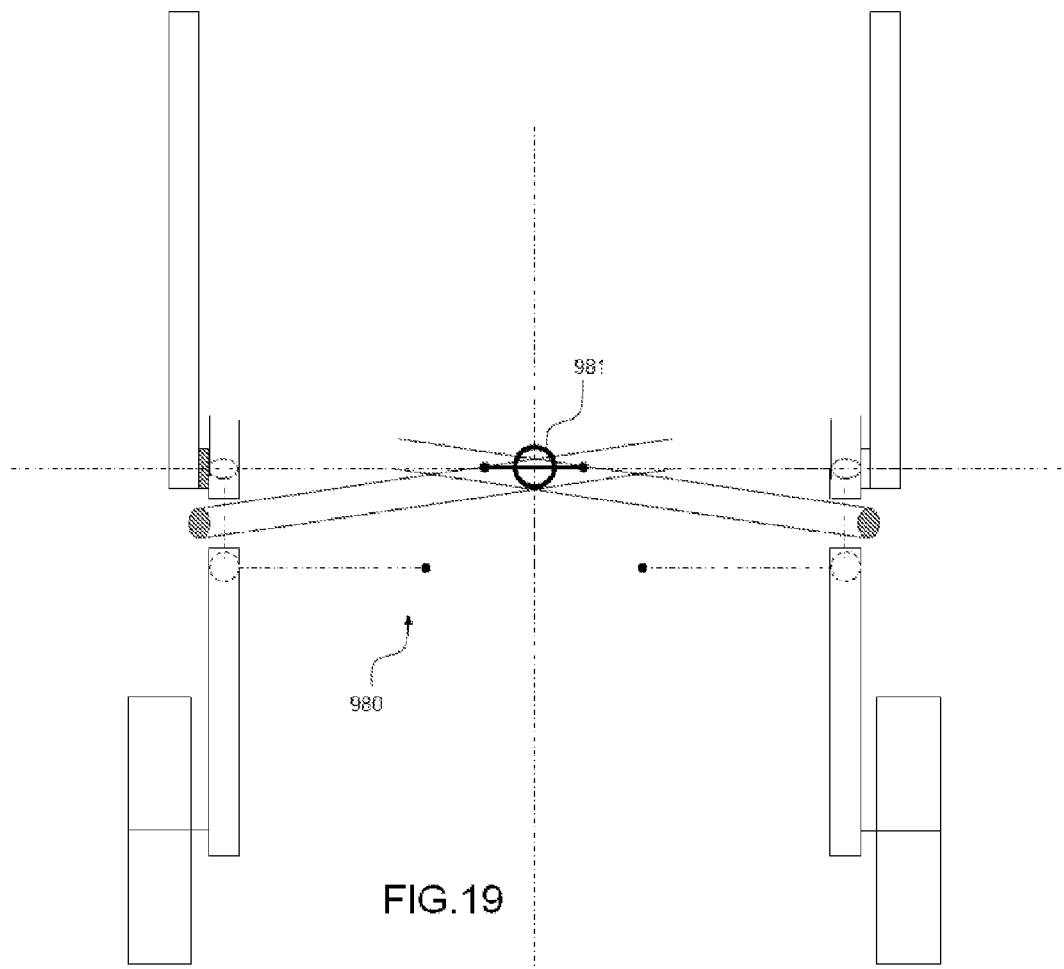

FIG. 19 illustrates an embodiment wherein a fulcrum 981 is shown. One solution is to treat the central point 981 of the folding device of the guiding frame. When the folding device of the frame is a cross, the fulcrum is for example the center of the cross. More generally, the fulcrum is the center of the articulation axis of the folding device of the guide frame, which may be the rear arms.

An embodiment of such a fulcrum is a hinge approximately 50 mm wide connecting two plates whose axis is positioned exactly in coincidence with the axis of rotation of rear arm.

Thus, the fulcrum is located in the line of intersection of three planes:
  the plane of the rear arms in the unfolded position, the arm initiating the rotational movement at the time of folding
  the horizontal plane which is parallel to that of the central cross when the central folding device is a folding cross;
  the vertical plane parallel to the rear wheel supports plane in unfolded position.

If mathematically, there is geometric coincidence of all possible constructions of the fulcrum in the different planes and vertical and longitudinal axis to which the fulcrum belongs, according to various embodiments, it is advantageous to use a difference of several millimeters from the theoretical position of the fulcrum points to construct fasteners for the synchronization and/or for rigidizing purposes devices.

On one side of the hinge corresponding to the upper part of the supporting structure, a plate is positioned in a first plane corresponding to the plane of the rear arms which is moving at the time of rotation of the folding.

On the other side of the hinge, at the lower part of the supporting structure, another plate is arranged in the volume of the horizontal and vertical planes which are unchanged in orientation at the time of folding. A second plane preferentially selected for the second plate is a vertical plane.

Figure 20:
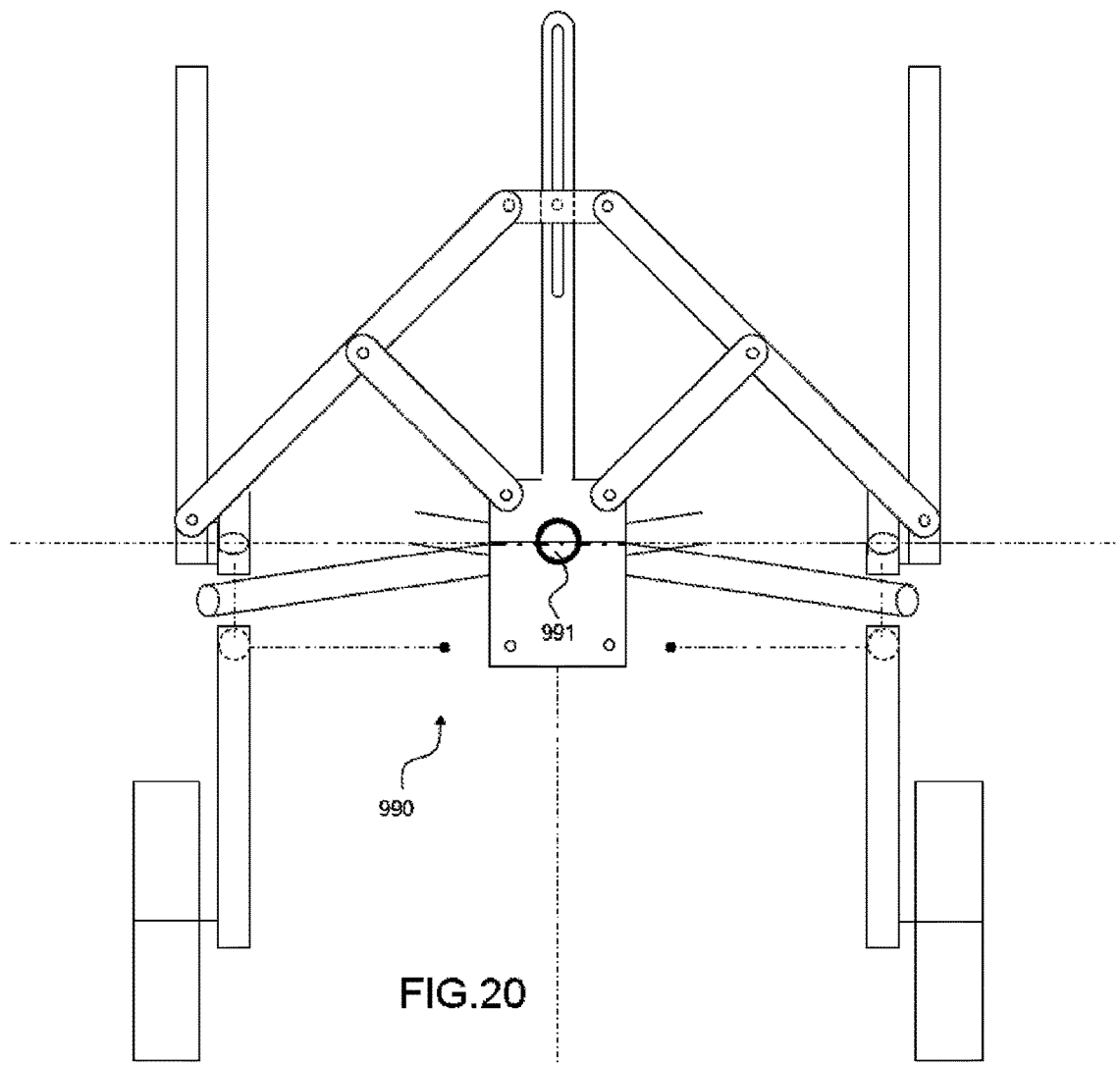

When the first plane is that of the rear arms of a stroller, an embodiment may be that shown in FIG. 20. In this embodiment, when the stroller is folded, the central hinge remains effectively centered on axis 991 in the centre/middle shown in FIG. 20.

Figure 21:
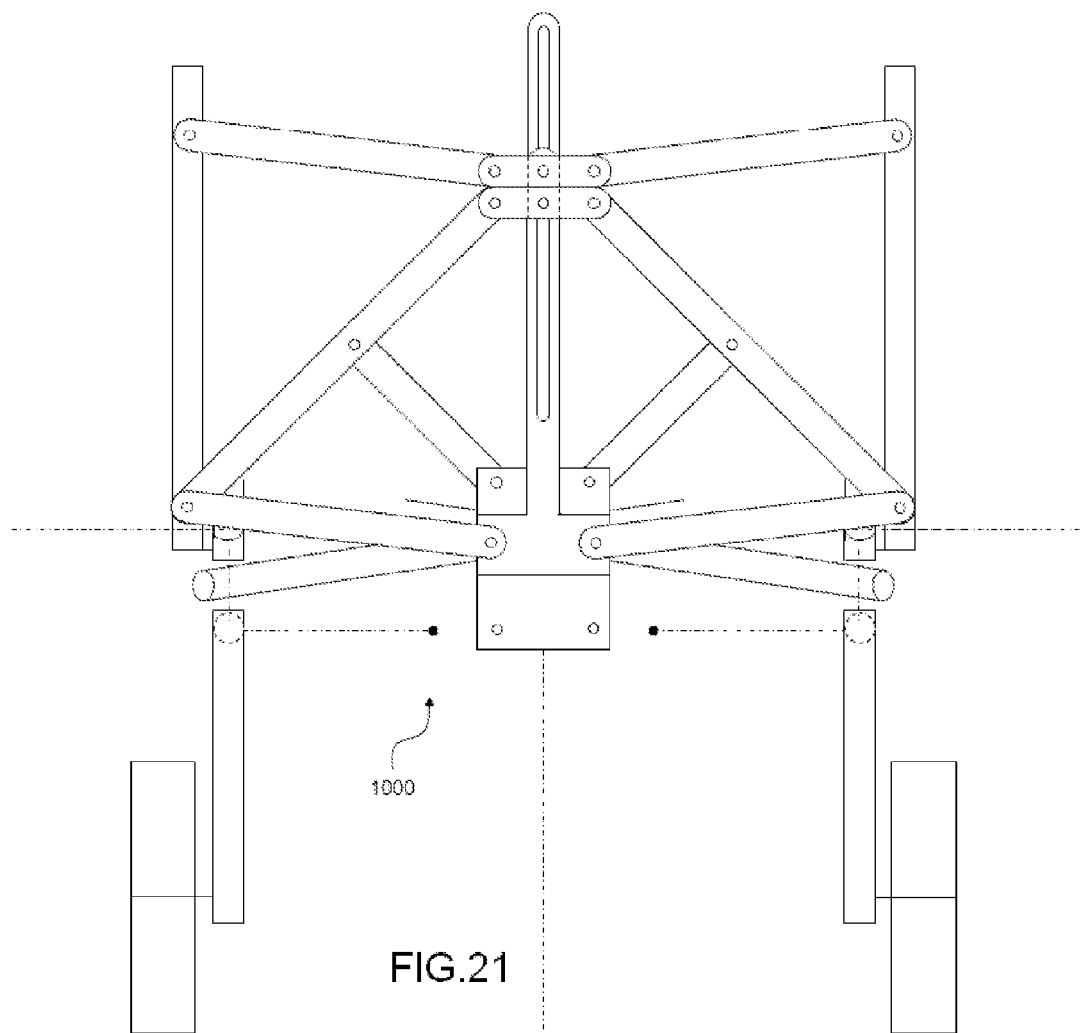

When this device is used, it is necessary to position the synchronization or rigidizing devices rods along common axes on the rear arms to keep the hinge's axis aligned with the axis of rotation of the rear arms, as is presented in an alternative embodiment of FIG. 21.

Figure 22:
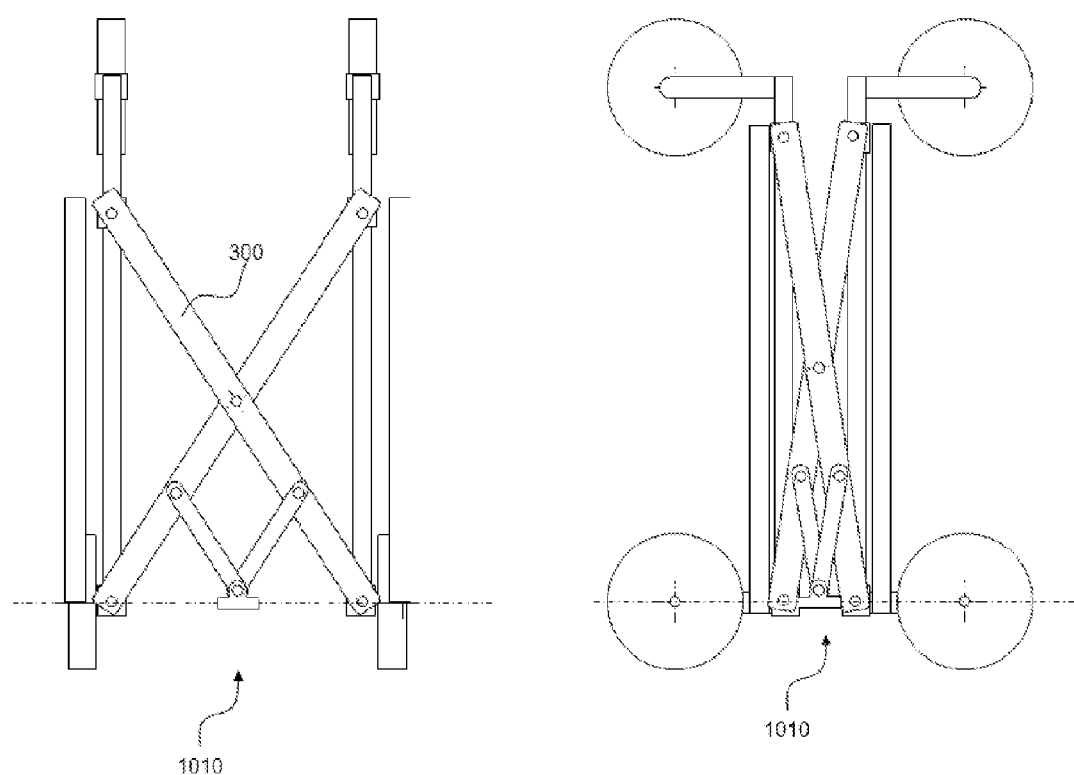

When the guide frame does not comprise a rear arm but only a central folding device such as a cross, the invention allows to set the synchronization device and/or rigidizing 1010 directly on the cross rods as is shown in FIG. 22.

It may be sufficient to connect by links whose length approximately one-quarter of the diagonals of the cross and secure them:
  on the one hand at half the length of the cross arm;
  on the other hand on a support perpendicular to the plate located at the lower part of the hinge (not shown in top view).

This embodiment allows to position the hinge in the longitudinal axis of the stroller. A rigidizing device can be added to the synchronization device, in particular:
  by doubling the links, for example by doubling device 1010 on the upper face and the lower face of the arms of the cross;
  by adopting a double articulation device as described previously, including using the central axis of the cross as a guide.

Figure 23:
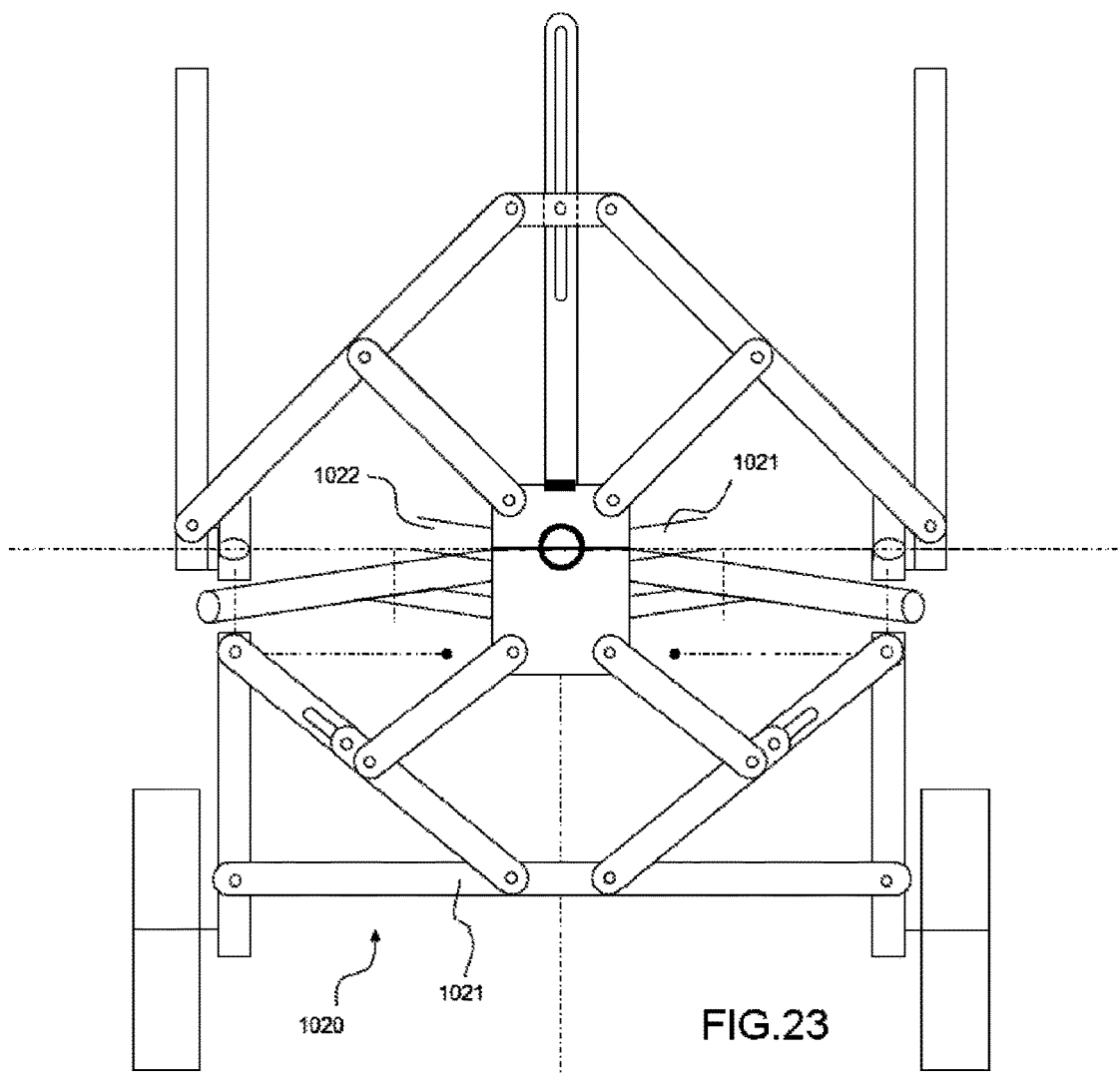

FIG. 23 shows an embodiment wherein the second plane, represented by rods 1021 and 1022 perspective, is a horizontal plane parallel to the central horizontal cross folding device.

Finally, in another embodiment, a third vertical plane comprises a vertical plate of about 50 mm width and 70 mm height. We can exploit this fulcrum to stiffen the connection structures described above.

In the context of a reduction in the size of synchronization and/or rigidizing devices, construction of the fulcrum can be adjusted. In particular, it may be advantageous to raise the crossbar, for example, due to the wheel size or due to the clearance. The invention thus relates to devices for saving compactness according to alternative embodiments of the invention.

Figure 24:
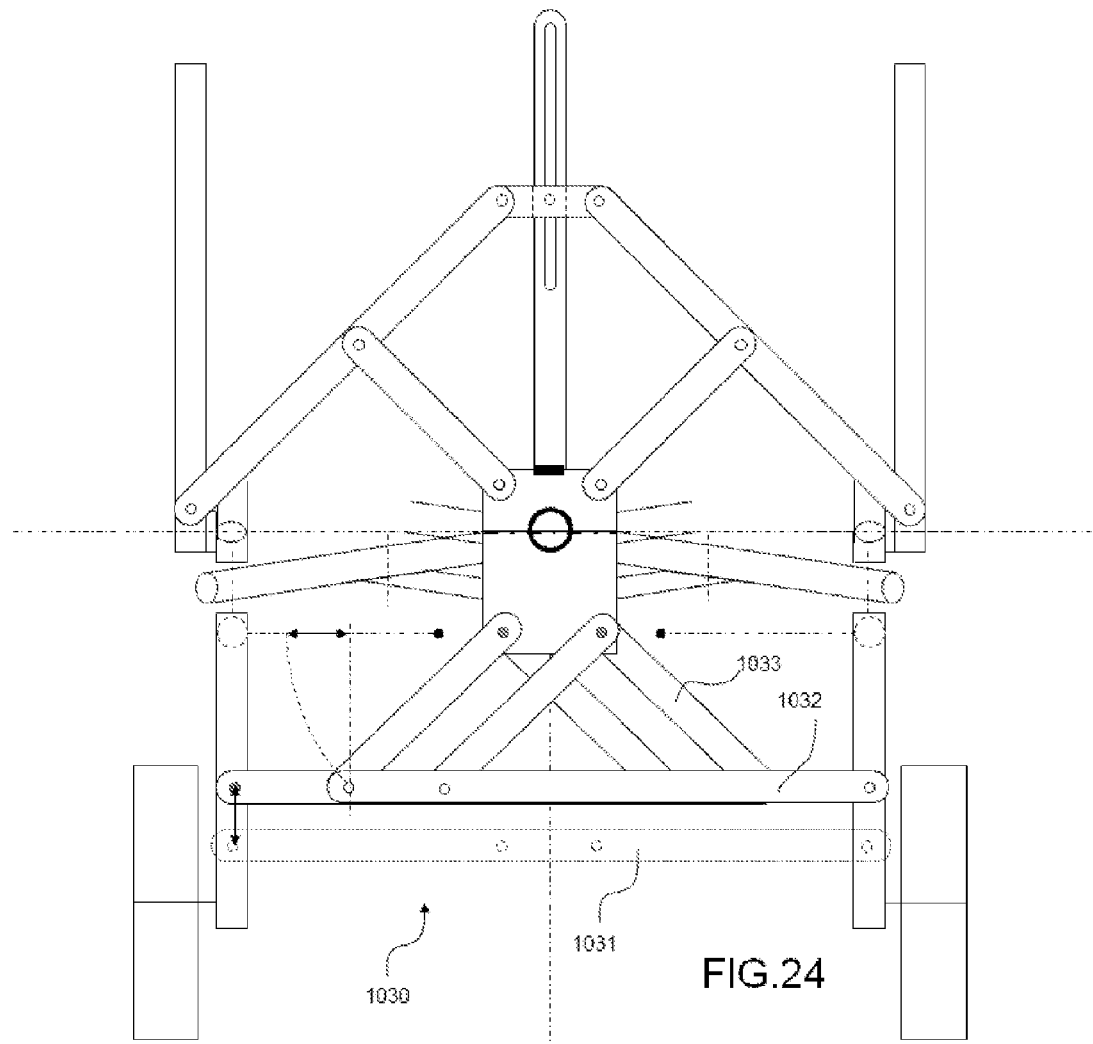

Device 1030 of FIG. 24 allows to offer a particular arrangement of synchronization device to gain ground clearance. Depending on the height to gain, this can be adapted according to the device of FIG. 23 wherein the horizontal bar 1021 is at a given height, the device of FIG. 24 wherein the height horizontal bar 1032 is at a second height higher than initial position 1031 of bar 1021.

FIG. 24 shows double parallel bars 1033 oriented at an inclination which may vary according to the folding of the synchronization device 1030. The position difference between the folded position and the unfolded position reduces height by 30%. The calculation is based on the facts that:
  In the folded position, the double bars 1033 are horizontal and;
  In the unfolded position they form a given angle of typically between 45° and 90° with the horizontal.

Figure 25:
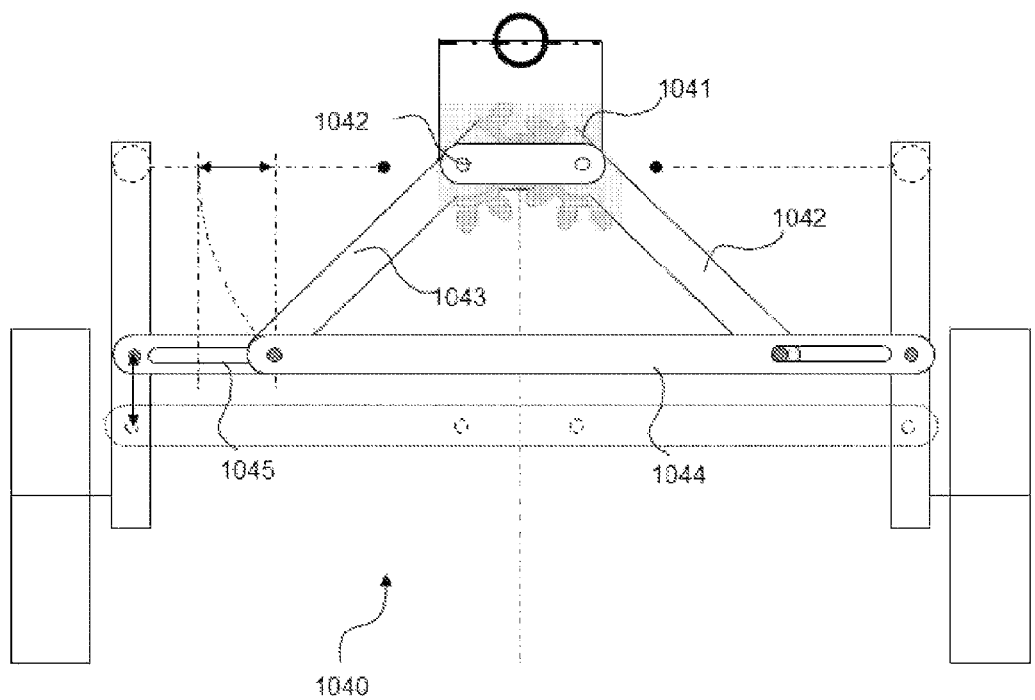

To ensure synchronization and simplify the device shown in FIG. 24, an improved synchronization device 1040, shown in FIG. 25, may be used. The latter comprises a double articulation with gears 1041 in which rotate two rods 1042 and 1043 held by a fastener 1041. Synchronization device 1040 allows the two crossbars 1044 and 1045 to slide with respect to each other.

In this connection, cross bar 1044 has a sliding function which currently requires to add a device to reduce friction for the comfort of the user. It is possible to use devices such as "drawer slide", e.g. ball bearings or with two rollers.

Furthermore, synchronization device 1040 comprising a double-articulation can be slightly moved upwards using the surface of the plate located between the alignment of axes secured to the wheels and the axis of the hinge of the plate.

Figure 26:
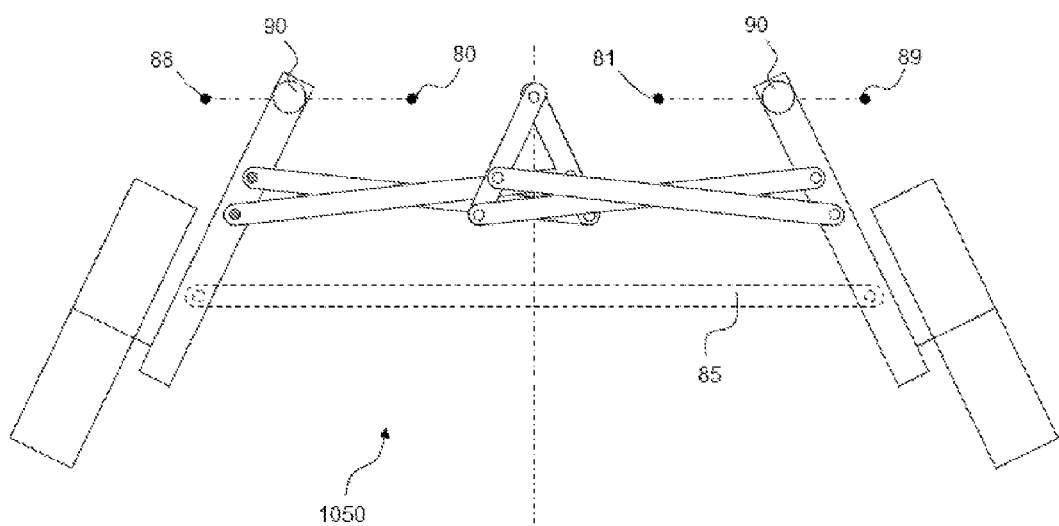

FIG. 26 shows an alternative 1050 comprising a central point constructed from the juxtaposition of said anti-parallelograms deformable links which are ½ scale of the device in FIG. 13.

The invention also relates to three-wheeled buggies, in which the single front wheel, is controlled by a central shaft connected to the fulcrum, also called midpoint. The central axis is in this embodiment then connected to either the rotation of the left wheel or the right depending on the selected link.

Figure 27:
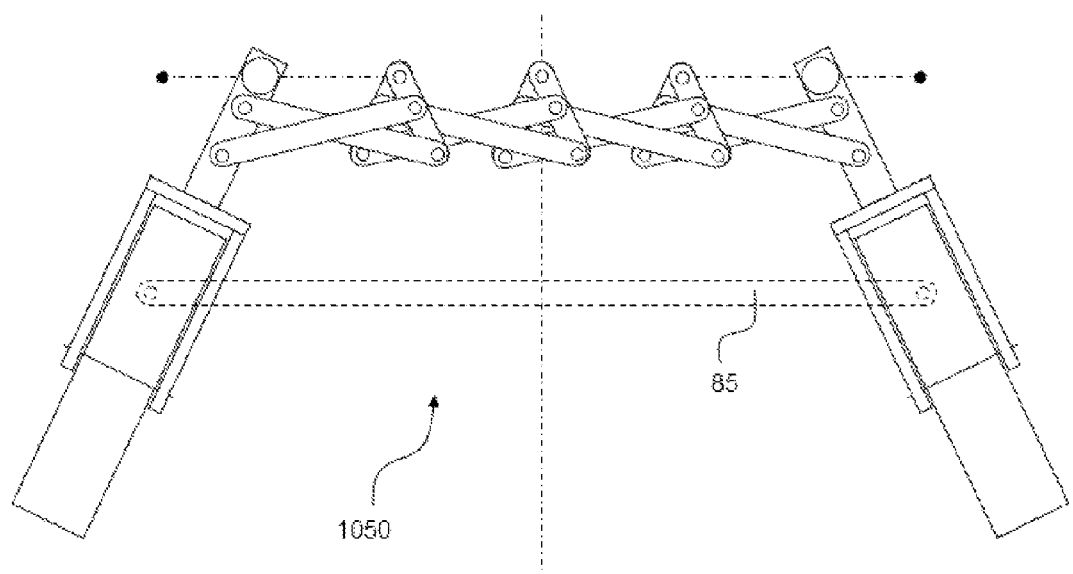

FIG. 27 shows a final alternative embodiment 1050 in which it is also possible to create in addition to the central bearing point positioned in the middle, additional intermediate support points positioned at ¼ and ¾ of the overall width.

In this case, it is possible to use these additional points by juxtaposing four links based on deformable anti-parallelograms, which are to scale ¼ of the solution described in FIG. 13.

The embodiments of FIGS. 26 and 27 are alternatives to the embodiment shown in FIG. 14. FIG. 14 has an advantage of dispensing of the construction of the fulcrum.

Figure 28:
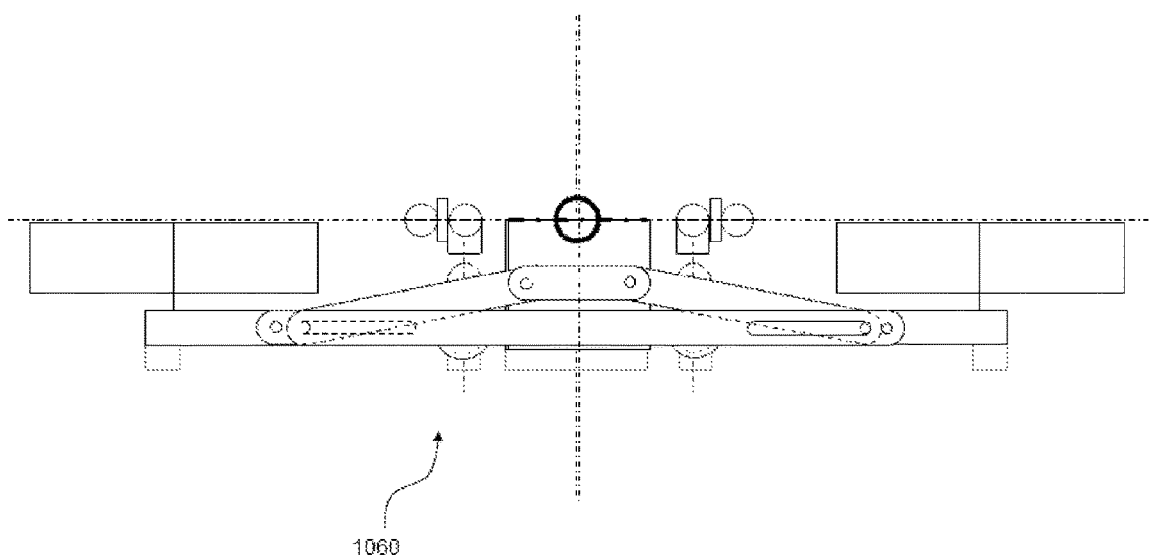

FIG. 28 shows a last embodiment comprising a synchronization device 1060 from connecting rods sliding in a fixed horizontal bar which is fixed by pivot links to the wheel supports to lower pivot point.

The synchronization devices of the invention allow to obtain an increased degree of freedom regarding the layout of the wheels themselves, particularly in the case of dual wheels and/or swiveling wheels, in particular by the development of complex solutions such as described previously.

A preferred embodiment of the invention relates to the synchronization devices positioned at the rear of the stroller, and comprising mechanical linkages. Furthermore, among these solutions, the devices for rotating not only rear wheels but also the front wheels through the link rods positioned on either side transmit the rotation kinematics.

In other embodiments, the synchronization and/or rigidizing devices may be implemented at the front of the stroller. This last option is of even more interest if the combination of the front synchronization device, the central device and the frame folding device is capable of ensuring by itself in a sufficiently rigid manner the rotation of both front and rear wheels and thereby allow the central part to dematerialize the two connecting rods arranged on each side.

This dematerialization of the central portion of the two connecting rods on each side can also be made possible by the adoption of a similar cardan transmission control systems of shutters between the front and rear wheels.

The geometrical and potentially aesthetic optimization depends on the choice of the diameters of the wheels which can vary significantly, and the freedom of choice of the axes of these wheels that may be offset longitudinally and/or laterally.

Finally, as shown in FIG. 28, the invention relates to a protective device positioned on the side of the folding links so as to avoid friction when the stroller is in folded position. These protection devices can advantageously be skates or protective feet. Wheel support may also have similar protective devices.

In response to an expectation of further compactness, it is also possible to provide as an alternative or in combination with the flat folding of the wheels in the horizontal plane, a variant for continuing rotation of the wheels to the vertical.

This alternative has the advantage of providing a gain in width and reduces the volume of the stroller especially when it is transported.

This configuration may result from:
a user expectation, depending on the space available to it to store the object/folded stroller;
a logistics requirement to reduce the volume of the product transported in its packaging
a marketing requirement to get a subjective impression of compactness through the folded product itself and/or its packaging.

In this embodiment the folding position corresponding to the horizontal position of the wheels is then a transitional position. This solution enables a continued rotation of the wheels to a final position 180° from the starting position by simply adapting the devices concerned.

Examples compared to devices already described above:
in manual version, this allows to offer alternative positions of lugs at 180° instead of 90°;
in helical ramp version, designing the corresponding guide
in gear version, choosing a gear ratio of 1:2, instead of a gear ratio of 1:1 of angle transmission at 90°.

In the latter case, it is also possible to keep the 1:1 ratio, using an angle duplicator:
either at input, for example on the arm of the stroller;
or at output, on the wheel supports.

Figure 30:
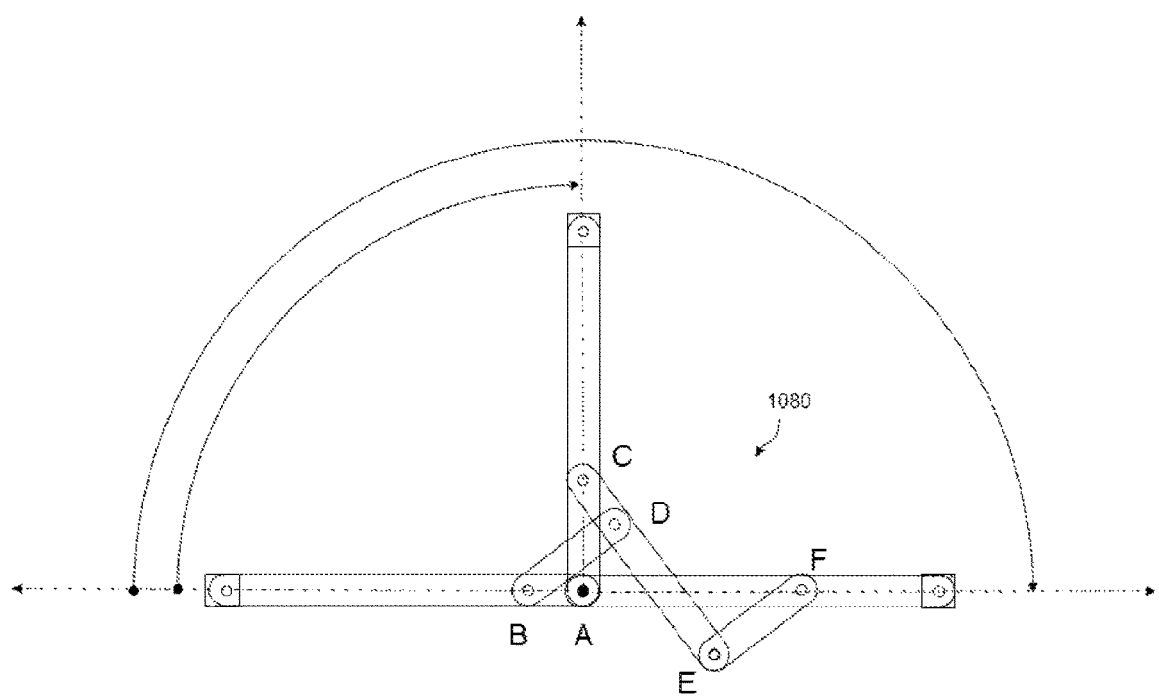

An example of angle duplicator 1080 is described in FIG. 30 and involves using a "bisector" solution from the "trisector" Alfred Kempe solution based on two anti-parallelograms, one ACEF which is twice the size of the other ABCD.

Note that in this figure, the embodiment has the following requested proportions for a length AB=CD=1:
AB=AC=EF=2;
CE=4.

Thus a rotation of a quarter turn is converted into a rotation of half a turn.

Figure 31:
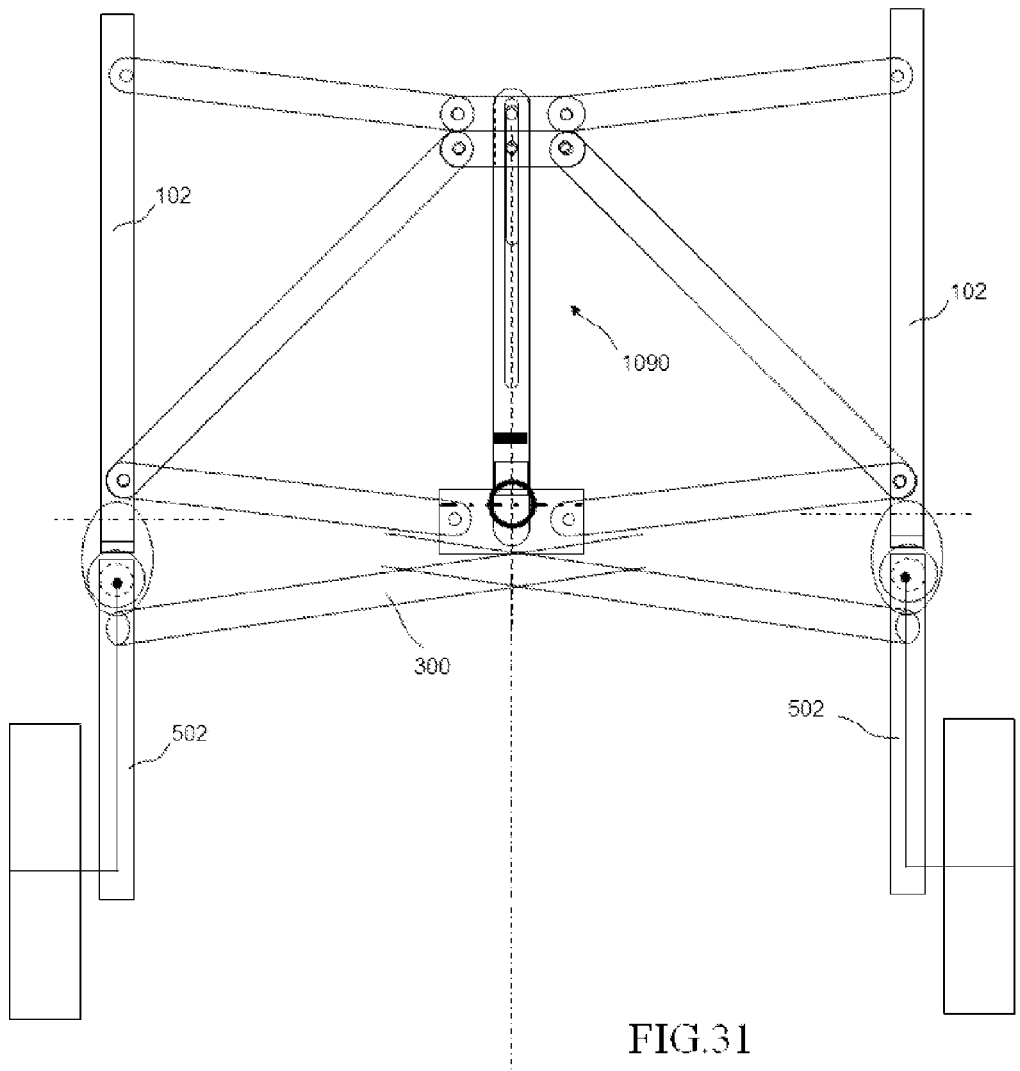

In the particular case of the superposition of the rear arm and axes fixed to the wheels, there is a configuration which leads to a different solution, for example represented by the solution of FIG. 31.

Two angle transmission devices at 90° connecting on the one hand rear arms 102 and on the other hand axes fixed to wheel supports 502.

Rear arms 102 are themselves connected by a compass-type device 1090 ensuring the parallelism of the two arms 102 and a locking position.

The two axes fixed to the wheels supports 502 are kept parallel by a foldable cross 300 intentionally positioned below axes 102.

Figure 32:
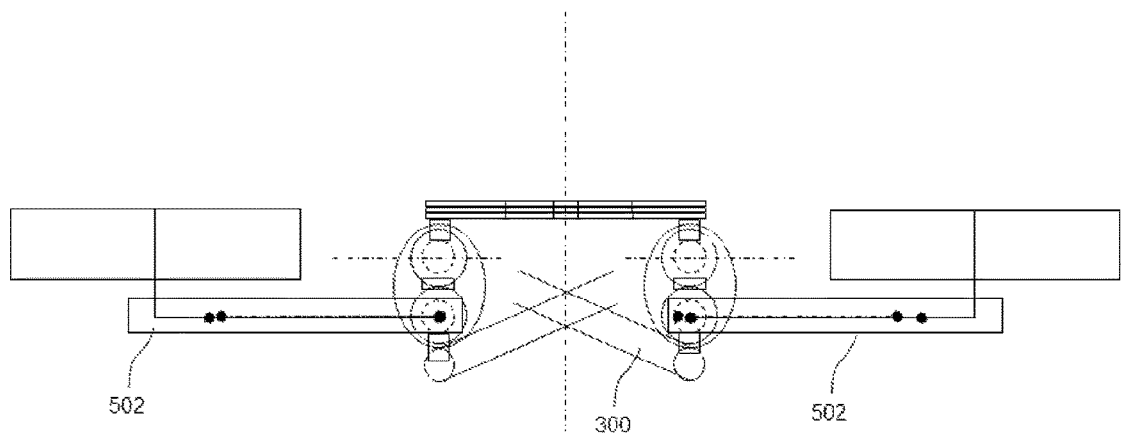

During the folding of the support structure or of the stroller, a first folding position is illustrated in FIG. 32. The Folded position of wheels 202 in the horizontal plane is consistent with the characteristics of the invention for a folding of substantially 90° wheels, that is to say:
arm 102 are lowered to the front, the compass is unlocked and folded in width;
the angle transmission mechanism rotates the wheels substantially a quarter turn;
cross 300 connecting the two axes secured to the wheel supports 502 as well.

The invention provides in an alternative embodiment the further rotation of the wheels by an additional angle of 90°, the wheel supports will have rotated a total angle of 180°. The supporting structure or stroller can be folded and then stored through a different folding position of the wheels: upside down and vertically.

In the 180° folding, the wheels are placed upside down at 180° from their initial positions. This rotation allows to find a practical method for compact transportation wherein the wheels are no longer located in a horizontal reference plane (that is to say when the stroller when folded is laid on the floor).

To realize this embodiment, the device allows to rotate a quarter turn the angle transmission devices.

The latter rotation involves:
- on the one hand that the device connecting rear arms 102 is mounted on a tube or sleeve having a degree of freedom of rotation of a quarter turn and;
- on the other hand that the foldable cross also has a degree of freedom of rotation to allow rotation of a quarter turn. It may also be completely free.

Figure 33:
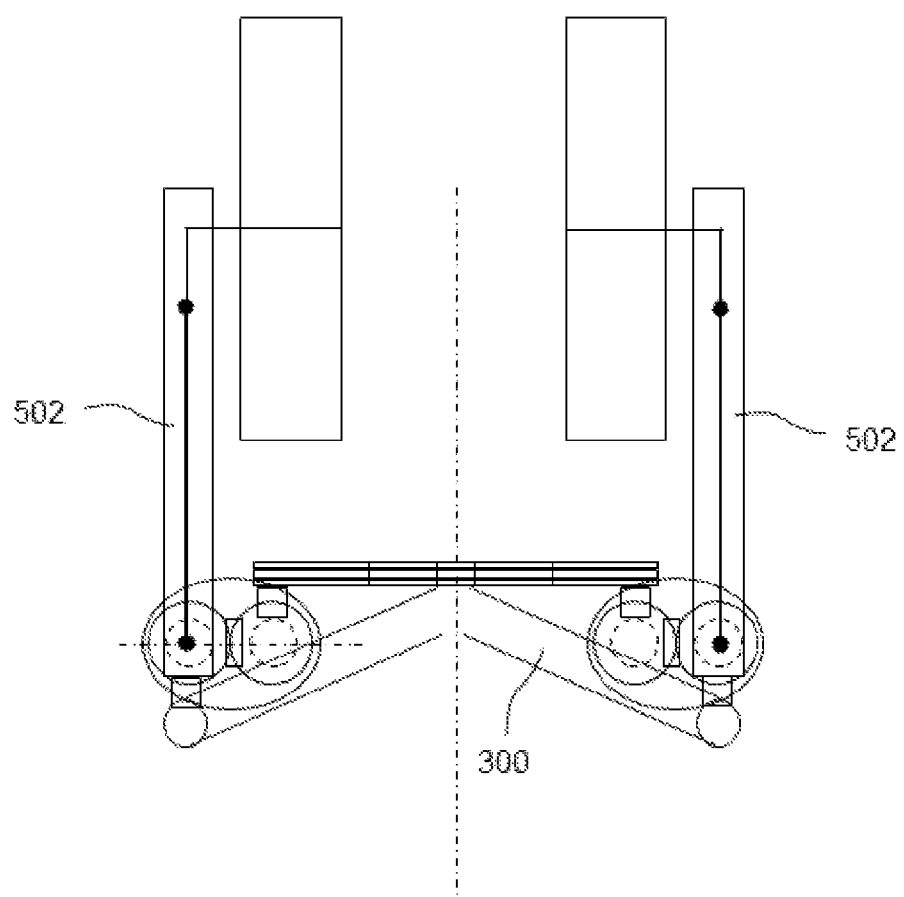

These conditions allow to obtain a folding position shown in FIG. 33 which corresponds to a further rotational movement of the wheels to a fully performed angle of 180°.

In this position, the rigidizing means can hold the rear arms folded in a plane perpendicular to a plane including at least the wheels folded at 180°.

It is interesting to constrain the degree of rotation of the device 102 which connects the rear arm, for example through:
- at least one lug positioned in a groove which limits the rotation to a quarter turn. This solution adds a stress stiffening in the open position;
- an indexing holes system and two positions placed at 90° to make the latter device manually "controllable";
- a ratchet system coming after mounting to inhibit this particular method which can be used in a packaging method for logistics and transportation.

Note that the position of folding wheels at 180° can also be used in a transportation position, that is to say the ability to transport the object folded, on the rear wheels by holding the handles on top of the object rear arm after turning it 180°.

The invention claimed is:

1. A bearing structure comprising:
    a wheel assembly defining a first front wheel assembly comprising at least two front wheels and a second rear wheel assembly comprising at least two rear wheels;
    front and rear wheel supports for supporting, respectively, the at least two front wheels and the at least two rear wheels, the front and rear wheel supports connected to, respectively, the axes of rotation of the at least two front wheels and the axes of rotation of the at least two rear wheels;
    a first folding device enabling a first folding causing a reduction in width of the bearing structure, and
    a connection system, connecting the front and rear wheel supports of the first and second assemblies to the first folding device, the connection system including two lateral connections that are placed on opposite sides of the bearing structure, wherein a space between the two lateral connections defines the width of the bearing structure,
    wherein the first folding device is configured to reduce the width of the bearing structure between a first position and a second position of said at least two front wheels and said at least two rear wheels,
    wherein the connection system enables a second folding of the at least two front wheels and the at least two rear wheels so as to allow a rotation substantially equal to 90° of the at least two front wheels and the at least two rear wheels in a horizontal plane when the least two front wheels and the at least two rear wheels are in the second position, and
    wherein, in the first position of said at least two front wheels and said at least two rear wheels, the width of the bearing structure has a first value and wherein, in the second position of said at least two front wheels and said at least two rear wheels, the width of the bearing structure has a second value, the second value being smaller than the first value.

2. The bearing structure according to claim 1, wherein the connection system enables a driving of the second folding by the action of the first folding.

3. The bearing structure according to claim 1, comprising a guide frame enabling to guide the bearing structure when the at least two front wheels and the at least two rear wheels are in the first position.

4. The bearing structure according to claim 3, wherein the guide frame comprises front arms, rear arms and handles, wherein the front and rear arms are movable to a substantially horizontal plane.

5. The bearing structure according to claim 1, further comprising a locking device for locking the position of the at least two front wheels and the at least two rear wheels when the at least two front wheels and the at least two rear wheels are in the first position or in the second position.

6. A stroller comprising a bearing structure according to claim 1.

* * * * *